United States Patent [19]
Wyatt

[11] Patent Number: 6,005,233
[45] Date of Patent: Dec. 21, 1999

[54] PRESSURE RELIEF SYSTEM FOR INDUCTIVELY HEATED HEAT RETENTIVE SERVER

[75] Inventor: W. Burk Wyatt, Brentwood, Tenn.

[73] Assignee: Aladdin Synergetics, Inc., Nashville, Tenn.

[21] Appl. No.: 08/892,059

[22] Filed: Jul. 15, 1997

[51] Int. Cl.⁶ .............................. H05B 6/12; A47J 27/088
[52] U.S. Cl. ........................ 219/621; 219/622; 219/634; 219/651; 126/246; 126/375; 99/DIG. 14
[58] Field of Search ..................................... 219/621, 622, 219/623, 624, 651, 730, 759, 686, 634; 126/375, 400, 246; 99/DIG. 14

[56] References Cited

U.S. PATENT DOCUMENTS

| | | |
|---|---|---|
| 1,415,216 | 5/1922 | Bingay . |
| 2,051,100 | 8/1936 | Nelson . |
| 2,620,090 | 11/1952 | Hill . |
| 2,625,242 | 1/1953 | Reed . |
| 2,784,737 | 3/1957 | Kelly . |
| 2,862,641 | 12/1958 | Philipp . |
| 3,065,744 | 8/1961 | Scavullo . |
| 3,207,172 | 9/1965 | Steer et al. . |
| 3,466,444 | 9/1969 | Lusk . |
| 3,508,183 | 4/1970 | Pinckard . |
| 3,557,774 | 1/1971 | Kreis . |
| 3,594,531 | 7/1971 | Hough .................................... 219/740 |
| 3,604,450 | 9/1971 | Botkin . |
| 3,610,459 | 10/1971 | Hansen . |
| 3,659,584 | 5/1972 | Doyle et al. . |
| 3,734,077 | 5/1973 | Murdough et al. . |
| 3,745,290 | 7/1973 | Harnden, Jr. et al. . |
| 3,772,624 | 11/1973 | Keogh . |
| 3,837,330 | 9/1974 | Lanigan et al. . |
| 3,916,872 | 11/1975 | Kreis et al. . |
| 3,972,442 | 8/1976 | Malcolm . |
| 4,059,096 | 11/1977 | Schneider . |
| 4,084,609 | 4/1978 | Johnson . |
| 4,086,907 | 5/1978 | Rothschild . |
| 4,246,884 | 1/1981 | Vandas . |
| 4,398,593 | 8/1983 | Casinelli ................................ 126/400 |
| 4,490,597 | 12/1984 | Mengel .................................. 219/686 |
| 4,505,180 | 3/1985 | Hinrichs . |
| 4,574,836 | 3/1986 | Barnard, Jr. . |
| 4,664,287 | 5/1987 | Wilson et al. . |
| 4,672,996 | 6/1987 | Floyd et al. . |
| 4,765,364 | 8/1988 | Arcari . |
| 4,796,777 | 1/1989 | Keller . |
| 4,859,822 | 8/1989 | Ragusa et al. . |
| 4,899,782 | 2/1990 | Krejza et al. . |
| 4,928,836 | 5/1990 | Wu et al. . |
| 4,937,019 | 6/1990 | Scott . |
| 4,982,722 | 1/1991 | Wyatt . |
| 4,990,247 | 2/1991 | Vadenberk . |
| 4,993,602 | 2/1991 | Casey . |
| 4,998,554 | 3/1991 | Rogers . |
| 5,012,945 | 5/1991 | Keenan . |
| 5,070,223 | 12/1991 | Colasante ................................ 219/759 |
| 5,117,999 | 6/1992 | Canzano et al. . |
| 5,137,050 | 8/1992 | Clarke et al. . |
| 5,228,384 | 7/1993 | Kolosowski . |
| 5,343,024 | 8/1994 | Prosise et al. .......................... 219/730 |
| 5,369,034 | 11/1994 | Hargett et al. . |
| 5,577,740 | 11/1996 | Purdom . |
| 5,603,858 | 2/1997 | Wyatt et al. . |
| 5,611,328 | 3/1997 | McDermott . |
| 5,643,485 | 7/1997 | Potter et al. ............................ 219/621 |

FOREIGN PATENT DOCUMENTS

98/051   2/1998   WIPO .

*Primary Examiner*—Philip H. Leung
*Attorney, Agent, or Firm*—Ohlandt, Greeley, Ruggiero & Perle

[57] ABSTRACT

A heat retentive server, comprising a central portion comprising a heat storage member formed of a material which is preferably susceptible to being heated by induction, is provided with one or more valves which are normally in closed positions, and are capable of opening to vent excess pressure in the central portion. In one preferred embodiment, a valve is placed so as to allow communication between the central portion and a different interior region of the server. In another embodiment, a valve is placed so as to allow communication between the central portion and the exterior of the server. In another embodiment, a server is provided with at least one valve of each type.

33 Claims, 11 Drawing Sheets

PRESSURE RELIEF SYSTEM FOR INDUCTIVELY HEATED HEAT RETENTIVE SERVER

BACKGROUND OF THE INVENTION

1. Field of the Invention

The present invention generally relates to heat storage dishes, and particularly to a system of pressure relief for heat storage dishes.

2. Description of Background Information

In environments where food is prepared and cooked in a central location and distributed and served to consumers who are remotely located, such as in hotels, in aircraft and in institutional settings such as hospitals and nursing homes, there is often a delay between the time that the food is prepared, cooked and subsequently placed on a plate or other serving dish, and the time that the food is eventually presented to the consumer for consumption at a remote location, such as a hotel room, hospital room, on aircraft, etc. Accordingly, by the time the food is presented to the consumer, the food can become cold unless special measures are taken to keep the food hot. Various approaches to such meal service problems encountered in such service environments, sometimes referred to as "satelliting" have been employed in the food service and container industries.

One approach to solving such problems associated with the service of meals involves the use of heat retentive servers, which are serving trays constructed and adapted to keep food hot for a longer period than such food maintained in an ordinary room-temperature environment, serving trays having insulated portions therein, and/or serving containers which retain heat. Heat retentive servers commonly comprise serving trays having insulated portions therein, and/or serving containers which retain heat. Such containers typically are adapted to receive a plate containing portions of a meal which are to be kept hot. Such servers typically include an insulated base portion and an insulated dome portion, which together cooperate to define an insulated enclosure which is adapted to receive a plate having such heated meal portions thereon, and maintain the plate and the meal portions in an insulated environment. In some instances, the heat retentive server can include a portion which acts as a heat storage "battery", or a heat sink.

Such heat retentive servers can be designed to support dishware, which in turn holds a portion of a meal which is to be kept hot. In such circumstances, such a base is commonly called a "pellet" base, and the entire system, i.e., the base, dome and plate, is referred to as a "pellet system". When a heat sink is incorporated into a server base and the base supports a food-carrying dish, such as a plate, the base can be referred to as a plate server.

The heat sinks in such systems can include, e.g., a phase-change core, such as that disclosed in U.S. Pats. Nos. 4,982,722 and 4,246,884. In other approaches, a solid heat sink can be used.

In the past, heat retentive servers have employed convection or conduction heating in order to either heat a food service dish or heat a storage battery during food service operations. U.S. Pat. No. 5,603,858, issued Feb. 18, 1997 to WYATT, and assigned to Aladdin Synergetics, Inc., of Nashville, Tenn., the entirety of which is hereby incorporated by reference as though set forth in full herein, discloses a heat retentive server that is capable of being heated by induction.

Recently, induction heating of heat retentive servers as well as inductively heated servers and serving systems have been introduced by Aladdin Synergetics, Inc., Nashville Tenn. and are experiencing rapid and widespread acceptance in the marketplace, even revolutionizing the industry. Whereas conventional systems required long lead times, inductively heated servers and server heating systems provide apparatus and methods whereby individual pellets can be heated very rapidly, for example, in periods of 5–10 seconds and can be employed to keep food hot for longer than 1 hour. Speed, therefore, is an important advantage in using such systems, in which individual pellets are rapidly heated at the start of a tray line. Another advantage of such systems is their ability to direct heat up toward the food while reducing waste of heat energy through the bottom of the server. Such systems are disclosed in U.S. Pat. No. 5,603,858 to WYATT, incorporated above by reference.

It is believed that Aladdin's systems have prompted others to attempt to enter the marketplace with inductively heated servers. Thus, another inductively heated server is disclosed in U.S. Pat. No. 5,611,328 to McDERMOTT, filed Sep. 19, 1995 and issued Mar. 18, 1997, in which a metal disk substantially fills the entire interior volume of the server and in which it is believed that substantial heat may be lost through the bottom of the server. The server is produced by insert molding and the structure surrounding the metal disk is seamless.

For reasons of safety and ease of handling, the heat storage battery may be enclosed within an airtight chamber. When the battery is heated, however, the surrounding air is also heated and expands. Thus, there exists the danger that if overheated, the pellet might burst. Different methods have been developed to deal with the increases in pressure within the pellet chamber of conductively or conventionally heated servers.

SCHNEIDER, U.S. Pat. No. 4,059,096, discloses an imperforate pellet enclosed in reinforced chamber. The pellet has reduced thickness in the center region which overlies a raised portion in the lower surface of the enclosure. It is the stated intent of the SCHNEIDER invention to reinforce the pellet enclosure in order to reduce the chance of bursting.

LANIGAN et al., U.S. Pat. No. 3,837,330, discloses a heat retentive server in which essentially the entire lower surface of the pellet enclosure is concave. Further, through an opening in the center of the pellet, the upper and lower surfaces of the enclosure are welded together. In this fashion, the stress caused by excess internal pressure causes reversible deformation of the heat retentive server.

ROTHSCHILD, U.S. Pat. No. 4,086,907, also discloses a heat retentive server with a concave bottom surface. Additionally, however, the lower surface of the enclosure is provided with rectangular indentations or corrugations to permit controlled deformation and allow the pellets to stack whether hot or cold.

MURDOUGH et al., U.S. Pat. No. 3,734,077, discloses a heat retentive server in which the pellet is provided with an opening in the central portion. The upper surface of the enclosure extends downward into the opening, and the lower surface of the enclosure extends upward into the opening, such that, in the central portion, the upper and lower surfaces are either in contact, or at least in close proximity. Upon buildup of excess pressure in the chamber, the upper and lower surfaces move slightly apart from one another, thus relieving the excess pressure.

KREIS, U.S. Pat. No. 3,557,774, also discloses a heat retentive server in which the pellet is provided with an opening in the central portion. Here, however, the upper surface of the enclosure is flat, and the lower surface extends upward through the opening. The upper and lower walls are welded together to strengthen the server against bursting.

Each of these methods is suited for conductively or connectively heated servers, which ordinarily take 60 to 90 minutes or more to heat to operational temperature. It is doubtful that any of these methods would work effectively for inductively heated servers, in which the temperature of the pellet can reach operational temperature very rapidly, in seconds. Further, if the heat retentive server, through excessive use, or through misuse, should develop small cracks, small amounts of water might seep in, which upon evaporation by heating, can cause a significant pressure increase. Due to the rapid temperature rise, there is available very little time in which the excess pressure can escape through the cracks.

The use of valves to limit pressure buildup in closed containers is known. For example, KOLOSOWSKI, U.S. Pat. No. 5,228,384, discloses a double-boiler which is a vented double-walled container wherein the vent optionally comprises a spring-loaded valve as a means of pressure relief The vent disclosed has a threaded valve housing onto which a threaded valve cap is placed. To permit threading the valve cap on the valve housing, the housing extends from the boiler cap on which it is mounted. By means of a spring which bears upward on the valve cap, a plug is brought to bear downward on a venting hole, thus sealing the hole for normal operation of the boiler. The valve itself is on a threaded cap used for covering the filling hole of the double boiler.

CLARKE et al., U.S. Pat. No. 5,137,050, discloses a spring-biased pressure relief valve for use with cryogenic pumps. The seal is made resistant to leaks caused by dust by the use of an annular projection on either the housing or the valve closure, and an o-ring on which the annular projection is brought to bear.

VANDENBERK, U.S. Pat. No. 4,990,247, discloses a spring-biased pressure relief valve for use in liquid filters such as engine oil filters. The part analogous to the valve stem consists of two pairs of oppositely situated legs with hooks for engaging the cylindrical spring. The valve also comprises a bellows and a flow restrictor.

BARNARD, U.S. Pat. No. 4,574,836, discloses a pressure relief valve with a bypass indicator and re-settable means to prevent closing of the valve after it has opened.

KELLY, U.S. Pat. No. 2,784,737, discloses a pressure relief valve for use on axle roller bearings of railroad rolling stock. The outlet portion of the valve housing is rabbeted to accommodate a metal ring. The closure end of the valve stem protrudes beyond the valve seat. The head of the valve stem has a stop member to prevent the valve from becoming stuck in the closed position should the valve closure be struck from the outside.

PURDOM, U.S. Pat. No. 5,577,740, discloses a container which includes a thermally activated diaphragm which may be fastened to the container with an adhesive material. The diaphragm comprises two layers, a thermally fusible layer, and a support layer. In the presence of excess temperature, the thermally fusible layer fuses and releases the support layer.

RAGUSA et al., U.S. Pat. No. 4,859,822, discloses a mnicrowaveable container, having a lid which optionally includes a vent, which vent may be a suitable one-way valve, for releasing steam or vapor generated during microwave heating of the food in the container.

FLOYD et al., U.S. Pat. No. 4,672,996 discloses a self regulating valve which can be used as a pressure relief valve for explosion prevention in microwave system-based, closed vessel digestion procedure. The valve includes a pressure-deformable, resilient wall member having a fluid vent port, and an obstructing member that cooperates with the wall member to open and close the valve.

WILSON et al., U.S. Pat. No. 4,664,287, provides for a pressure relief vent comprising a flat rupturable diaphragm. The diaphragm is attached to the outside surface of the container along a perimeter and at a spot location within the perimeter. In one embodiment, fluid is permitted to flow between the diaphragm and the outer surface of the container. In another embodiment, the heart-shaped diaphragm is welded to the container. In another embodiment, the spot location produces a stress concentration, allowing the diaphragm to rupture at a predetermined pressure.

DOYLE et al., U.S. Pat. No. 3,659,584, discloses a disposable metallic double-boiler An outer chamber contains water or other cooking fluid, and an inner chamber contains food. In order to use the device, an adhesive tape is removed from the lid, the container is pierced, and the tape is replaced. The container is then heated on a stove. The replaced adhesive tape acts to retain the cooking vapors inside the container, but will be forced off the opening if the internal pressure becomes too high.

SUMMARY OF THE INVENTION

The present invention provides a method and apparatus for preventing excessive buildup of pressure within an enclosed volume or region. The invention comprises placement of a valve which is capable of allowing communication between a first interior region and a relief region, wherein the relief region is selected from the group consisting of a second interior region, and an exterior region. Accordingly, the present invention provides two valves which may be used, for example, to prevent the buildup of bursting pressure within a pellet chamber.

As used herein with respect to the interior region and either relief region, the terms "volume" and "region" are equivalent and may be used interchangeably. Further, regardless of orientation, the term "upper chamber" refers to the first interior region, the chamber in which excess pressure buildup is to be avoided, and "lower chamber" refers to the second interior region, which, when present, may comprise a relief region.

In one embodiment of the present invention, the relief region comprises the atmosphere, which may be considered an exterior region. This embodiment provides a heat retentive server with a reciprocating valve which under normal operating conditions remains closed. In the presence of excess pressure in the pellet interior, the valve opens and vents the excess pressure to the atmosphere. Once the pressure decreases below a predetermined threshold, the valve closes.

In another embodiment of the present invention, the relief region comprises an insulating region, which may be considered a second interior region, proximate to the interior region. This embodiment provides holes or openings in the wall of the pellet enclosure. The holes or openings are preferably closed with membranes that are substantially impermeable to gas. In a preferred embodiment utilizing this aspect of the invention, the server preferably comprises a second chamber underneath the pellet enclosure chamber. The second chamber preferably is filled with a foam insulating material. In the presence of excess pressure in the upper chamber, the membrane ruptures, and the excess pressure is vented into the insulating material. As used herein with respect to this type of valve, the term "rupture" is used in a broad sense and includes, for example, tearing or perforation of the membrane as well as disattachment of the membrane, which itself remains intact, from the surface to which it is attached.

Thus, the present invention provides a heat retentive server preferably adapted to be inductively heated comprising an enclosure defining an interior region and an exterior region, a heat storage member disposed within the interior region, the heat storage member preferably comprising a material which is susceptible to being heated by induction, and a valve capable of opening in response to an increase in pressure in the interior region relative to pressure in the exterior region to allow fluid communication between the interior region and the exterior region.

The valve of the heat retentive server preferably also comprises an opening in the enclosure, the opening comprising a valve seat, a valve member comprising a valve closure portion a resilient biasing member constructed and arranged to urge said valve closure portion toward the valve seat, and a resilient sealing member disposed between said valve closure portion and said valve seat, so that, in the presence of increased pressure in the interior region relative to the exterior region, the increased pressure causes the valve to open, thereby venting fluid from the interior region to the exterior region, and the resilient biasing member otherwise brings the valve closure portion, resilient sealing member and valve seat into sealing engagement. The resilient biasing member preferably comprises a spring, even more preferably a conical spring. The resilient sealing member preferably comprises an o-ring, even more preferably a quad seal.

In another embodiment of the present invention, the server comprises an additional enclosure defining an insulating region, wherein the insulating region is substantially separate from both interior region and exterior region, the server further comprising an additional valve, wherein the additional valve is capable of opening in response to an increase in pressure in the interior region relative to the insulating region to thereby vent fluid from the interior region to the insulating region. In this embodiment, the enclosure and additional enclosure preferably have a common wall portion, the additional valve comprises an opening and a membrane substantially impermeable to fluid, the opening is in the common wall portion to allow communication between the interior region and the insulating region, the membrane is within said insulating portion and is positioned to cover the opening, so that the additional valve is capable of opening in response to an increase in pressure in the interior region relative to the insulating region, thereby allowing communication between the interior region and the insulating region. Preferably, the opening comprises a cluster of multiple openings. Preferably, the membrane comprises a polyolefin. Preferably, the membrane is adhesively attached. The adhesive attachment can be preferably accomplished with an adhesive material disposed between the membrane and the common wall portion, or with fastening members which comprise a substantially planar adhesive face, the adhesive face contacting both the membrane and the common wall portion, thereby adhesively attaching the membrane to the common wall portion. In a preferred embodiment, the fastening member comprises four fastening members. In another preferred embodiment, the membrane comprises a first side facing the opening and a second side facing the insulating region, and insulating region comprises insulation, preferably foam insulation.

In another aspect, the present invention preferably provides a heat retentive server preferably adapted to be inductively heated comprising a first wall and a second wall, the first and second walls being generally planar and generally parallel to each other the first wall and second wall being generally sealingly joined, defining an interior region therebetween, an exterior region substantially separate from the interior region, a heat storage member within the interior region, the heat storage member preferably comprising a material which is susceptible to being heated by induction, and at least one valve, wherein the at least one valve is capable of opening to allow fluid communication between the interior region and the exterior region. In a preferred embodiment, the server further preferably comprises a third wall, the third wall being generally planar and generally parallel to one of said first and second walls the second and third walls being generally sealingly joined, defining a chamber therebetween, the second wall having a first side facing the interior region, and a second side facing the chamber, wherein the exterior region is substantially separate from the interior region and the chamber, and wherein the at least one valve is capable of opening to allow fluid communication between the interior region and at least one of the chamber and exterior region. Preferably, the second wall is provided with an opening disposed to allow communication between the interior region and the chamber, and the valve comprises a membrane, the membrane is adhesively attached to the second side of the second wall, and the membrane is positioned to cover the opening in the second wall, the valve being capable of opening in response to an increase in pressure in the interior region relative to the chamber to thereby allow fluid communication between the interior region and the chamber. In a preferred embodiment, the chamber comprises insulation, preferably foam insulation.

In another embodiment of this aspect, the second wall is preferably provided with an opening disposed to allow communication between the interior region and the chamber, the valve preferably comprises a membrane, the membrane is preferably substantially planar, and comprises a first face and a second face, the first face of the membrane adhesively attached to said second side of said second wall, the membrane disposed to cover the opening, and the membrane substantially impermeable to gas, so that, in the presence of an increase in pressure in the first interior region relative to the chamber, the membrane ruptures, thereby allowing communication between the interior region and the chamber. In a preferred embodiment, the opening in the second wall comprises a cluster of four openings. In a preferred embodiment, the chamber comprises insulation, preferably foam insulation.

In another embodiment of this aspect, the valve preferably comprises at least one fastening member, the fastening member comprising a substantially planar adhesive face, the adhesive face of the fastening member contacting both the second face of the membrane and the second side of the second wall. In a preferred embodiment, the chamber preferably comprises insulation, preferably foam insulation.

In another embodiment of this aspect, the valve preferably comprises a conduit, comprising a valve housing, to connect the interior region and the exterior region, and a valve member disposed inside the conduit, the valve permitting fluid communication between the interior region and the exterior region in the presence of an increased pressure in the interior region relative to the exterior region, the valve preferably otherwise substantially preventing fluid communication between the interior region and the exterior region. Even more preferably, the valve comprises a conduit to connect the interior region and the exterior region, the conduit comprising a valve seat, a valve member comprising a valve closure portion, a resilient sealing member disposed between the valve closure portion and the valve seat; and, a resilient biasing member constructed and arranged to urge the valve closure portion toward the valve seat; so that, in the presence of an increased pressure in the interior region relative to the exterior region, the increased pressure causes the valve to open, thereby venting fluid from the interior region to the exterior region, and the resilient biasing member otherwise brings the valve closure portion, resilient sealing member, and valve seat into sealing engagement. Even more preferably, the second wall is provided with a first opening, the third wall is provided With a second opening, and the conduit connects the first opening and the second opening.

In another preferred embodiment, there is provided a heat retentive server preferably adapted to be inductively heated comprising a first chamber containing a member preferably susceptible to being heated by induction, the first chamber preferably comprising an interior and exterior, and comprising a wall comprising a first valve, the first valve preferably being capable of opening to allow fluid communication between the interior of the chamber and the exterior of the chamber, and a second chamber, the first chamber also comprising a second valve, the second valve preferably capable of opening to allow fluid communication between the interior of the first chamber and the second chamber.

In another aspect, the present invention preferably provides a heat retentive server adapted to be inductively heated comprising an enclosure defining an interior region, a heat storage member disposed within the interior region, the heat storage member preferably comprising a material which is susceptible to being heated by induction, a relief region preferably selected from the group consisting of a second interior region and an exterior region, and a valve capable of opening in response to an increase in pressure in the interior region relative to pressure in the relief region.

BRIEF DESCRIPTION OF TE DRAWINGS

The foregoing, and other features and advantages of the invention will be apparent from the following more particular description of the preferred embodiments, as illustrated in the accompanying drawings, in which reference characters refer to the same parts throughout the various views, and wherein.

DETAILED DESCRIPTION OF THE INVENTION

Figure 1:
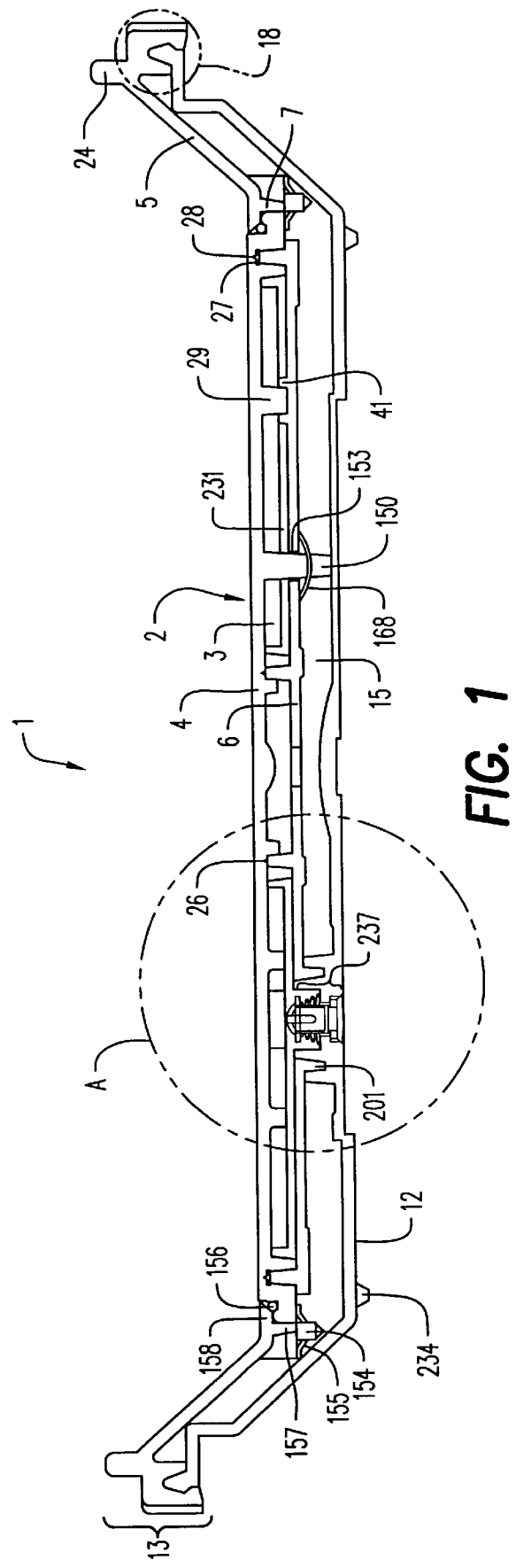
FIG. 1 is a generally transverse cross-section of one embodiment of the inventive heat retentive server.

Heat retentive servers of the present invention comprise a heat storage member, preferably one capable of heating by induction, enclosed within a central portion defining a substantially air-tight chamber. This chamber may be referred to herein as the "upper chamber" or "interior region." In preferred embodiments, the servers of the present invention also comprise a region with insulation, termed the "insulating region," which is advantageously located below the interior region and serves both to reduce heat loss and to direct heat transmission upward toward the food. The insulating region may be defined as part of the "exterior region," which, except as otherwise specified, may also be defined as including all regions aside from the interior region.

Before being "plated" with food, the heat storage member in the upper chamber of a heat retentive server is typically heated from room temperature, generally from about 65° F. to about 75° F. or greater in kitchen environments, to temperatures in excess of 375° F. This rise in temperature results in an increase in pressure of the air in the upper chamber from a first pressure $P_1$ to a second pressure $P_2$. Under the approximation of the ideal gas law:

$$P_2 = P_1 \frac{T_2 + 459}{T_1 + 459}$$

where $T_1$, and $T_2$ are expressed in degrees Fahrenheit. Thus, an increase in temperature from 75° F. to 375° F. results in a change of pressure from 1 atmosphere to approximately 1.6 atmospheres, or a gauge pressure (pressure differential) of about 0.6 atmospheres. It is possible that defects, such as small cracks, could develop with use and/or misuse of the servers. If even only a small amount of water were to seep into the upper chamber through these defects, then upon heating the water would evaporate into a gas and increase the internal pressure possibly much more than the expected 0.6 atmospheres. It is further possible that the pathway of pressure relief or escape back through the defects and to the atmosphere may be too slow to effect relief of the excess pressure. This may be especially true where the heating is done over a very short time period, i.e., about ten seconds, as occurs with an inductively heated server. The rate of pressure increase, therefore, is important in the present invention, especially in comparison to conventionally heated servers, where the rate of temperature increase inside the server is relatively slower. As an example, a pressure increase of 0.6 atm over a 90-minute period, a typical period for conventional heat retentive servers, is equivalent to a rate of increase of less than 0.007 atm/min, whereas the same increase over a ten second period is equivalent to a rate of increase of about 3.6 atm/min. Thus, the introduction of inductively heated servers has also given rise to a need for relieving pressure in such servers which need has heretofore not existed.

In accordance with the present invention, heat retentive servers are provided with at least one valve disposed so as to permit venting of built up pressure in the upper chamber. The inventive heat retentive servers vent pressure into a relief region, which may comprise a lower chamber of the server, or the environment outside the server. Thus, by relieving pressure in the upper chamber, heat retentive servers of the present invention bear a reduced risk of bursting.

The present invention provides novel heat retentive servers. The present invention also provides a system of pressure relief for inductively heated heat retentive servers, wherein the pressure relief apparatus and heat retentive servers comprise a pressure-relief system.

Because the inventive pressure relief system forms part of the inventive server, it is instructive to discuss the materials, structures and assembly of the inventive server as a whole before detailing the materials, structures and assembly of the inventive pressure relief system.

FIG. 1 is a schematic representation of a heat retentive server of the invention, generally designated as 1, in transverse cross-section. The heat retentive server of this embodiment preferably comprises a generally disk-shaped central portion generally designated as 2. The generally disk-shaped central portion preferably comprises a generally disk-shaped heat storage disk 3.

In the embodiment shown in FIG. 1, generally disk-shaped central portion 2 comprises a generally disk-shaped upper member 4, against which the heat storage disk is retained. One way of retaining the heat storage disk within the generally disk-shaped central portion is to provide a lower member 6 which, in the embodiment of FIG. 1, is also generally disk-shaped. In such embodiments, lower member 6 cooperates with generally disk-shaped upper member 4 to substantially surround the heat storage disk. Upper member 4 may serve, among other functions, as a connecting member by means of which an outer peripheral ring 5 may be maintained in place with respect to the central heat storage disk 3. In some embodiments, the outer ring 5 can be maintained in relationship with heat storage disk 3 by means other than the connecting member, with or without suitable cooperating means to maintain such relationship.

Generally disk-shaped lower member 6 is secured to generally disk-shaped upper member 4. Suitable securing means include, but are not limited to, e.g., sonic welding, e.g., ultrasonic welding. Other ways to secure lower member 6 to upper member 4 include solvent welding, spin welding, adhesive bonding, etc. The particular way of securing lower member 6 to upper member 4 can be optimized depending on the particular materials selected to be employed in the upper member 4 and lower member 6. The particular way of securing these members together can be readily selected by those of ordinary skill in the art.

In the embodiment of FIG. 1, securing is accomplished through ultrasonic weld joints and speed nuts. In this embodiment, an inner annular ultrasonic weld joint 26 and an outer ultrasonic weld joint 27 are employed. Preferably, annular ultrasonic weld joints 26 and 27 are provided with a lead 28 which, during welding operations, spreads or flashes up each side of the weld joint. Additionally, upper member 4 and lower member 6 are provided with cooperating extensions 29 and 41 which are generally transverse to the plane of the central member. Extensions 29 project through cooperating holes 51 in the heat storage member and are matingly inserted into annular extensions 41. Further, upper member 4 is provided with extensions 150 which project through cooperating holes 151 in the heat storage member and through cooperating holes 152 in lower member 6. Extensions 150 are preferably retained in holes 152 with speed nuts 168 as will be described in more detail below. The structure of portions of the inner and outer annular members and generally pillar shaped members or swage posts provided on upper member 4 and lower member 6, prior to welding, are discussed in more detail below.

Figure 8:
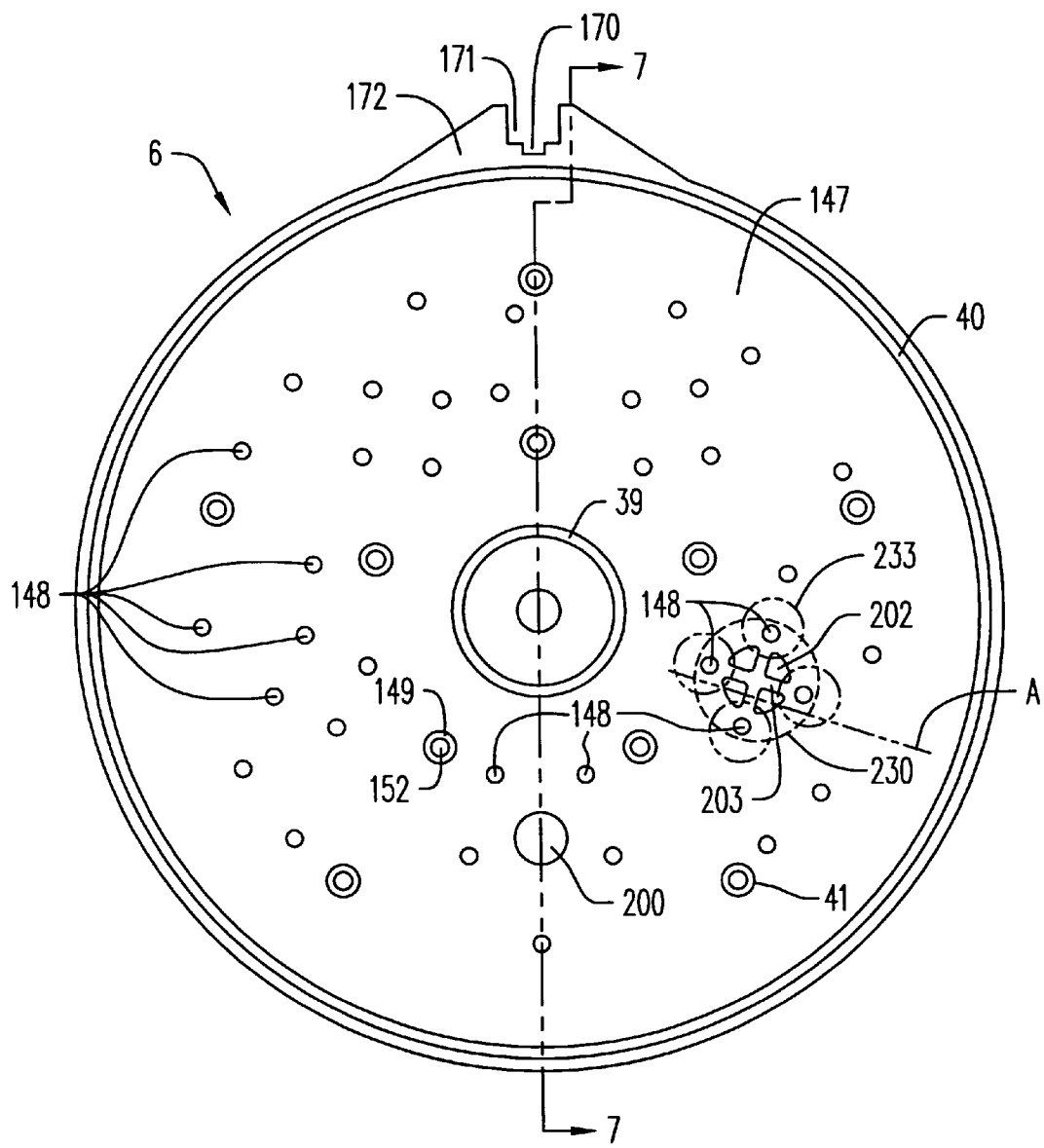
FIG. 8 is a top plan view of the lower member of FIG. 7, which encloses the heat-retentive element, prior to assembly of the heat retentive server of the invention.

Referring to FIG. 8, lower member 6 is preferably provided with structure to maintain a gap, and therefore an airspace, between upper surface 147 of lower member 6 and heat storage disk 3. Thus, lower member 6 is preferably provided with a plurality of standoffs 148. In order to avoid undue clutter, not all standoffs 148 in FIG. 8 have lead lines. The number and locations of the standoffs is not critical, but should be sufficient to maintain a gap or airspace, and may be determined by those of ordinary skill in the art, who should consider the pressure exerted by the expanding foam on assembly of the server. As shown in FIG. 8, in a preferred embodiment, there are preferably about thirty-seven standoffs 148, including one set of four around each of holes 202 and 200. The standoffs around holes 202 and 200 also serve to maintain functionality of the respective valves by preserving a pathway for the relief of pressure. Additionally, annular ribs 41 and 149 preferably also serve as standoffs or spacers.

Preferably, the ultrasonic welding of outer ultrasonic weld joint 27 is accomplished with an ultrasonic welding horn sized and configured to impart ultrasonic energy of sufficient frequency, amplitude and direction to the outer weld joint 27. The ultrasonic welding horns employed are preferably fabricated and optimized for the proper configuration and tuning which corresponds to the joint being welded. Thus, for joint 27 the ultrasonic welding horn is conventional and design, fabrication and optimization of a suitable ultrasonic welding horn can readily be made by those of ordinary skill in the art. A relatively smaller ultrasonic welding horn is employed for the inner annular weld joint 26, and the horn and design, fabrication and optimization thereof are also conventional. Other welds, as may be desired in some embodiments of the present invention, can also have welding horns designed by those of ordinary skill in the art.

Alternatively, lower member 6 and upper member 4 cooperate to partially enclose the heat storage member 3. In another alternative, the heat storage disk can be integrally injection molded as a member of the central disk-shaped portion.

Figure 4A:
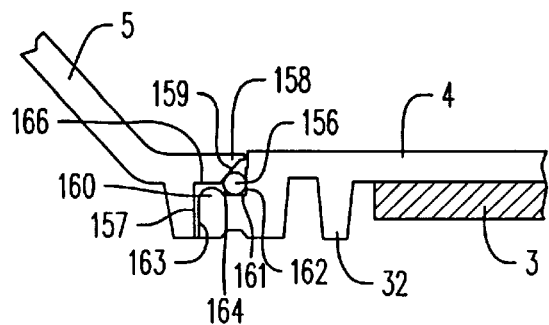
FIG. 4a is a generally transverse cross-section of a partially assembled outer ring, upper member and heat retentive member. The view generally corresponds to plane A of FIG. 3.
Figure 4B:
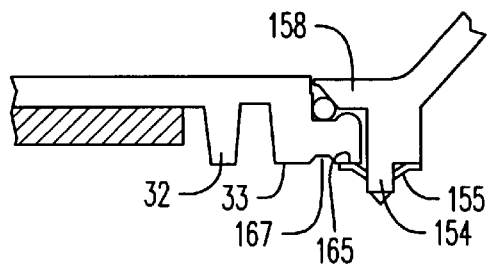
FIG. 4b is similar to FIG. 4a, but the cross-section is along plane B of FIG. 3 in order to show a preferred method of connection between the central disk-shaped portion and the outer ring.
Figure 3:
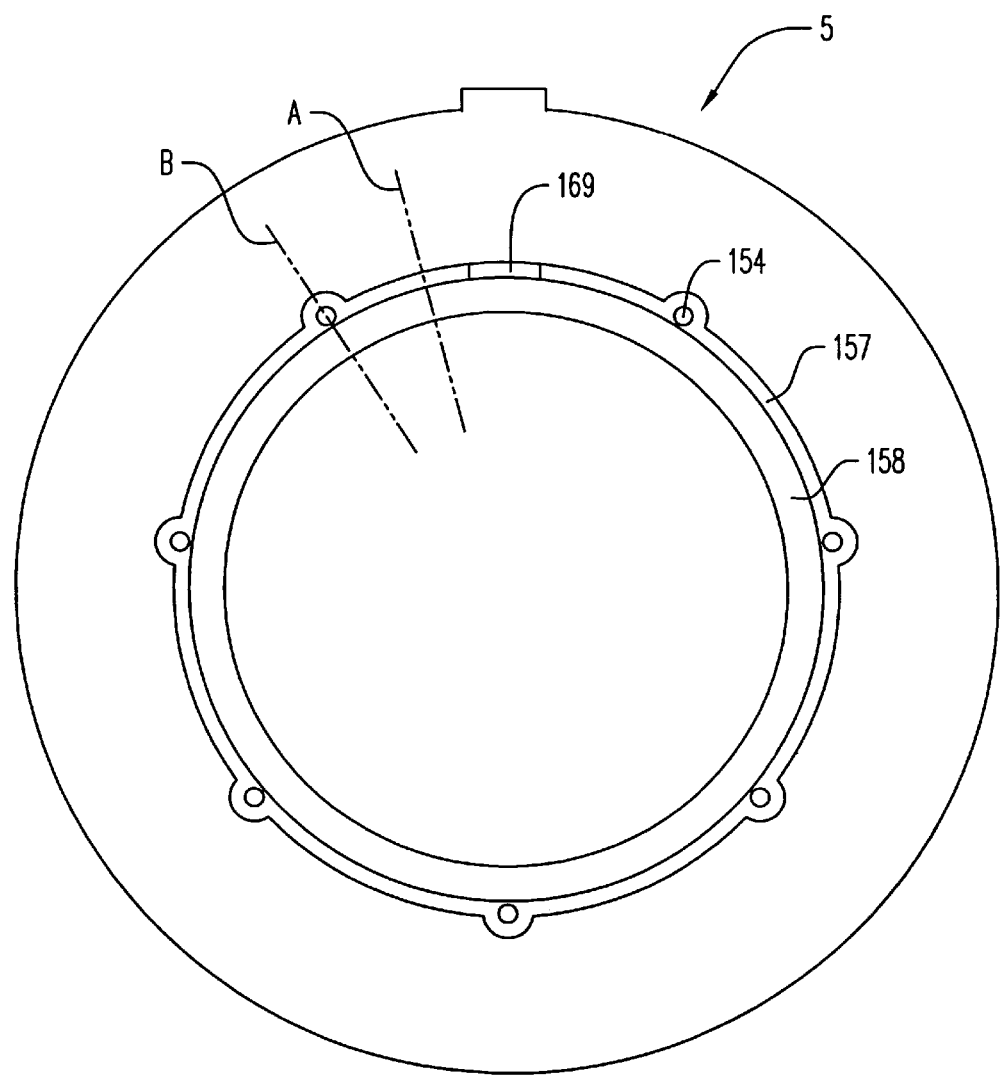
FIG. 3 is a view from below of a preferred outer ring, prior to assembly of the heat retentive server of the invention.

A view from below of outer ring 5 is presented in FIG. 3. Outer ring 5 is provided with annular rib 157, a plurality of posts 154, and circular flange 158. Closer views of a partially assembled server, taken along lines A and B of FIG. 3, are presented in FIGS. 4a and 4b, respectively. Flange 158 projects inward of annular rib 157. The outer diameter 163 of upper member 4 is slightly less than the inner diameter of annular rib 157. Similarly, diameter 162 of upper member 4 is slightly less than the innermost diameter of flange 158. Resilient sealing member 156 is disposed in volume 164 between flange 158 of outer ring 5, and surfaces 161 and 162 of upper member 4. Volume 164 for resilient sealing member 156 may be increased by providing flange 158 with bevel 159. Posts 154 project beyond lower surface 165 of upper member 4. Connecting units 155, which are placed on posts 154, engage surface 165, thereby urging upper member 4 toward flange 158. This compresses resilient sealing member 156 between flange 158 of outer ring 5 and surfaces 161 and 162 of upper member 4, thereby creating a seal. An excessive degree of compression of resilient sealing member 156 is avoided by the cooperation of annular rib 160 and lower surface 166 of flange 158, which are brought into engagement during assembly when connecting units 155 are attached to posts 154. Annular indentation 167 is optional, and serves to keep the thickness of the material somewhat uniform.

In a preferred embodiment, post 154 has diameter 0.125 inches, and connecting unit 155 is a flat steel octagonal speed nut with an outside edge-to-edge distance of 0.375 inches, and an inside edge-to-edge distance of 0.110 inches. Speed nuts fitting this description may be obtained from The Palnut Company, Mountainside, N.J., but any suitable speed nut may be employed.

Alternatively, the upper generally disk-shaped member 4 and lower generally disk-shaped member 6 cooperate to form an annular volume within which an inner peripheral rim of the outer peripheral ring 5 is received and retained. A configuration embodying this type of structure is illustrated in U.S. Pat. No. 5,603,858, incorporated above by reference. Further, upper member 4 and lower member 6 could be integrally molded as a single piece surrounding the heat storage member 3. Thus, lower member 6 can be integral with and part of upper member 4 in such embodiments.

The outer ring-shaped peripheral member 5 can be formed of any suitable material, such as a plastic material, preferably an injection-moldable plastic material such as a polyolefin-based plastic materials, such as polypropylene. A preferred material is MACROBLEND, available from Bayer corporation, located in Pittsburgh, Pa. Other suitable materials can be readily selected by those of ordinary skill in the art.

The upper and lower generally disk-shaped members can also be formed of suitable plastic materials. Preferably, these members are formed of heat resistant material, such as glass filled plastic resin materials. For embodiments wherein the upper and lower members are ultrasonically welded, preferred materials are those which can be ultrasonically welded, but which are also heat resistant. Suitable resins can be selected by those of ordinary skill in the art and include MINDEL glass filled resin available from Amoco of Atlanta, Ga., and VALOX glass filled resin, available from General Electric, of Pittsfield, Mass. Preferred resins are glass filled. A preferred material is referred to as RADEL, available from Amoco, of Atlanta, Ga.

Resilient sealing member 156 may comprise an o-ring or a sealing composition or compound. In preferred embodiments, resilient sealing member 156 comprises an o-ring comprising nitrile rubber. The nitrile rubber employed is conventional, and suitable rubbers can be readily selected by those of ordinary skill in the art. Preferably, the nitrile rubber is 50 durometer (Shore A). The o-ring may be prepared, for example, from spliced rope of the material, or may be molded as a unitary ring with no splices or other joints. In order to test the suitability of the o-ring material, samples were placed in an aggressive rinse additive. Preferred materials showed no degradation after six weeks. Other materials, such as silicone rubbers, may also be used.

Optionally, central portion 2 may be provided with a sheet of fiberglass insulation below generally disk-shaped heat storage member 3. The fiberglass sheet may also be retained in place by lower member 6.

Additionally, a bottom cover 12 is preferably provided. In the embodiment of FIG. 1, the bottom cover is secured to outer ring 5 at the upper or outer rim portion 13, of ring 5. Preferably, the bottom cover is secured to the ring by means of a "snap-fit" connection 18. As used herein, the term "snap-fit" connection refers to the type of connection and technology which is the subject of U.S. Pat. No. 5,145,090 to WYATT, issued on Sep. 8, 1992. The entirety of this patent is hereby incorporated by reference as part of this disclosure as though set forth in full herein.

Bottom cover 12 can be secured to outer ring 5 at outer rim or upper portion 13, at or near lower or inner rim portion 7, or anywhere therebetween.

The area between bottom cover 12, central portion 2 and ring portion 5 defines an insulating space 15 which can be filled with an insulating foam. The foam can be an open or closed cell foam. A closed cell foam is preferred. The foam may also be foamed-in-place as disclosed in U.S. Pat. No. 5,145,090. When foamed-in-place, such foams facilitate the snap-fit connection, as disclosed therein. In the present invention, such foams also assist in the functioning of the pressure relief system, and in the creation and maintenance of airtight seals. Suitable foams include, but are not limited to, self-expanding foams such as polyurethane. Preferably, the foam also serves to force together the interlocking members which comprise the snap fit connection.

Figure 5:
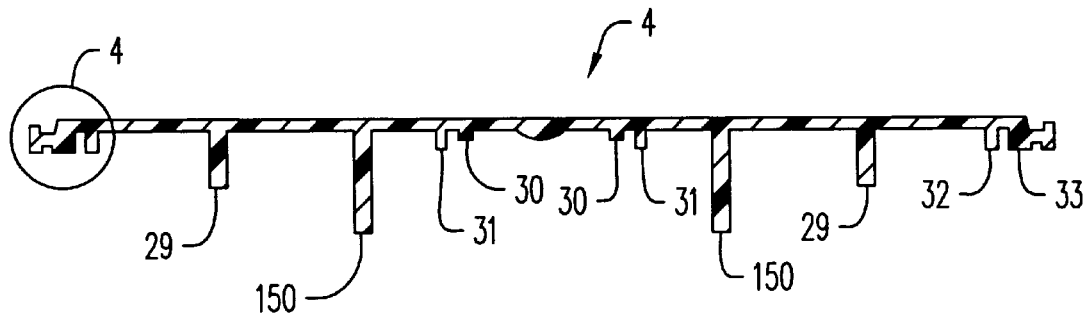
FIG. 5 is a generally transverse cross-section, taken along a plane similar to that of FIG. 1, of a preferred upper member which encloses a heat-retentive element, for example, in cooperation with the upper member of FIG. 6, prior to assembly of the heat retentive server of the invention.
Figure 6:
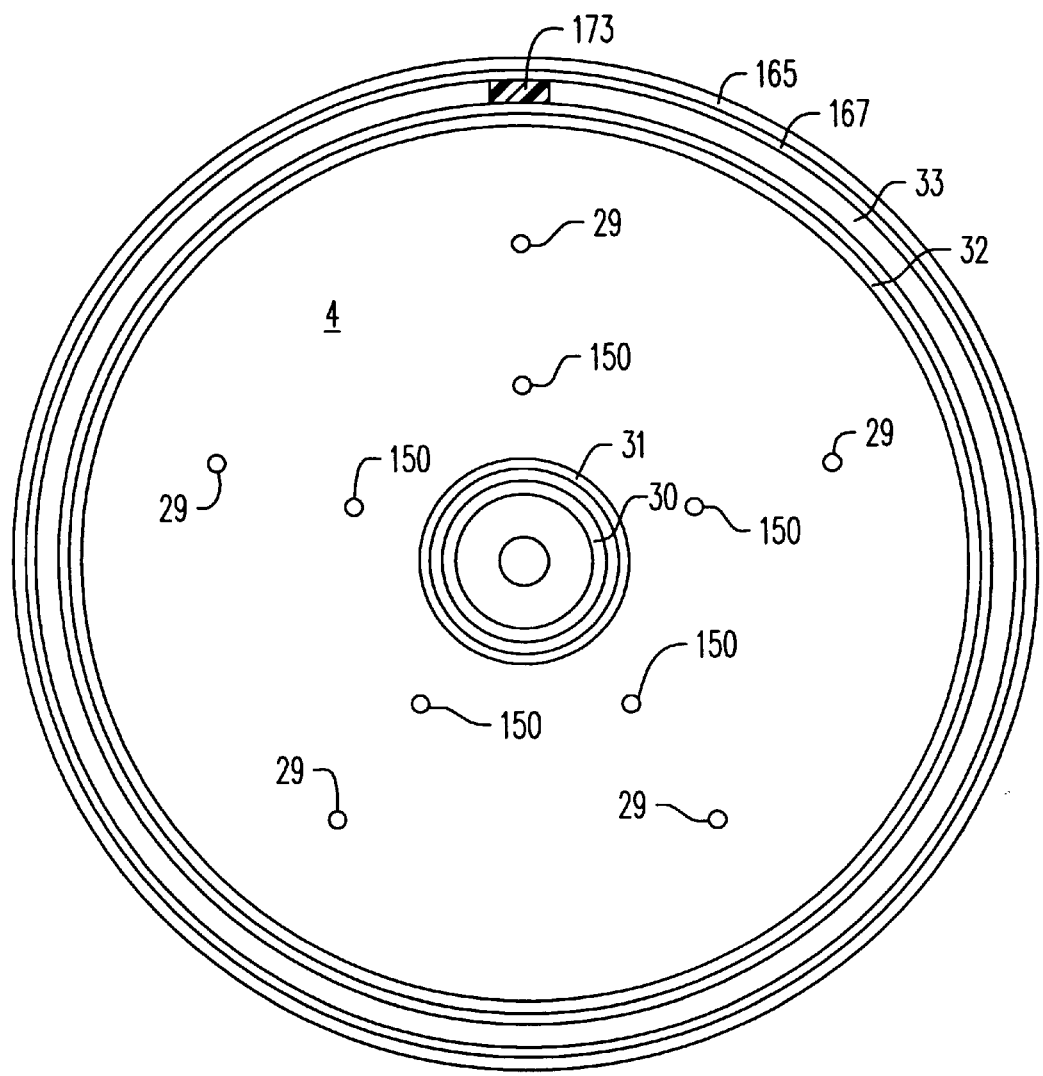
FIG. 6 is a bottom plan view of a preferred upper member of FIG. 5 which encloses the heat-retentive element, prior to assembly of the heat retentive server of the invention.

As is shown in FIGS. 5 and 6, upper member 4 is preferably provided with a plurality of generally pillar shaped members which are generally transverse to the plane of upper member 4. Upper member 4 is also provided with a pair of annular ribs 30 and 31 which together form a portion of the inner annular weld joint 26, and a second pair of annular ribs 32 and 33 which together form a portion of the outer annular weld joint 27. Once assembled, surface 165 cooperates with connecting units 155 applied to posts 154 on outer ring member 5 to retain the outer peripheral portion of upper member 4 to inner peripheral portion of outer ring 5. In preferred embodiments, annular rib 160 and surfaces 161 and 162 of upper member 4 cooperate with beveled flange 158 to define an annular void.

Figure 11:
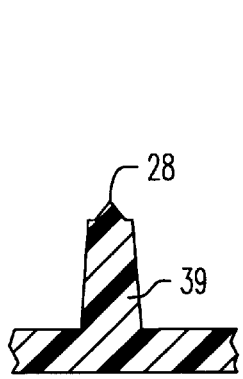
FIG. 11 is an enlarged cross-section of portion C of FIG. 7, showing a schematic representation of a preferred outer rib and lead for ultrasonic welding, prior to assembly of the heat retentive server of the invention.
Figure 9:
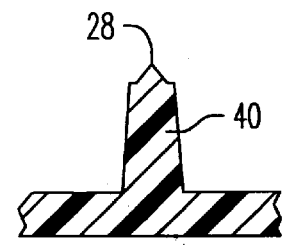
FIG. 9 is an enlarged cross-section of portion A of FIG. 7, showing a schematic representation of a preferred outer rib and lead for ultrasonic welding, prior to assembly of the heat retentive server of the invention.

Outer rib 40 is shown schematically in FIG. 9, and inner rib 39 is shown schematically in FIG. 11. Each of ribs 39 and 40 is provided with an annular lead 28 which during welding melts and flows to each side of the sonic weld joint.

Figure 10:
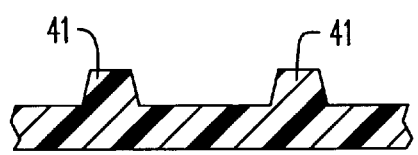
FIG. 10 is an enlarged cross-section of portion B of FIG. 7, showing a schematic representation of a preferred annular extension, prior to assembly of the heat retentive server of the invention.

FIG. 10 shows a cross-section of a typical annular boss 41. Bosses 41 cooperate with holes 51 to receive posts 29.

Figure 7:
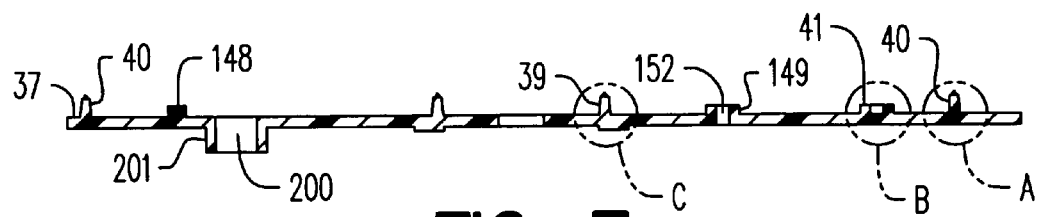
FIG. 7 is a generally transverse cross-section, taken along a plane similar to that of FIG. 1, of a preferred lower member which encloses the heat-retentive element, prior to assembly of the heat retentive server of the invention.

Referring to FIGS. 7 and 8, the lower member 6 is preferably formed with an inner annular rib 39 for cooperating with inner rib 30 and outer rib 31 of upper member 4 shown in FIGS. 5 and 6, which in assembly cooperate to form the inner weld joint 26 shown in FIG. 1. An outer rib 40 is provided on lower member 6 for cooperating with the inner rib 32 and outer rib 33 of upper member 4 shown in FIGS. 5 and 6 to form the outer weld joint 27 shown in FIG. 1. Openings 152 are provided which cooperate with extensions 150 of upper member 4. Additionally, raised annular portion 41 is provided.

Figure 12:
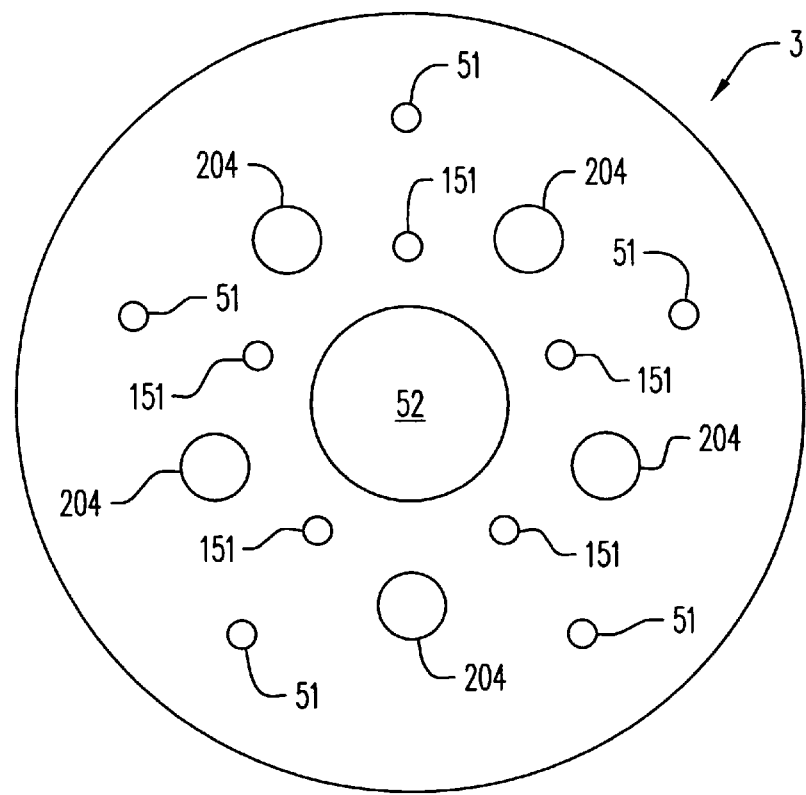
FIG. 12 is a top plan view of the heat storage member of FIG. 1.

FIG. 12 shows a preferred embodiment of the heat storage disk 3. It has been found that, when a metal disk is employed, preferred results are obtained by optimizing a combination of mass of the metal disk, diameter of the metal disk, thickness of the metal disk, as well as the number of holes and diameter of holes which are present in the disk. In preferred embodiments a mass of from about 450 grams to about 475 grams is preferred, an outer diameter of about 6.4 inches to about 6.6 inches is preferred, most preferably about 6.5 inches and a thickness of about 0.117 inch to about 0.125 inch is preferred. Preferably, the metal disk should contain from about 10 to about 12 holes, generally designated as 51 or 151, which are preferably generally round in top plan view, and the holes should have a diameter of from about 0.218 inch to about 0.225 inch.

It has also been found that there are important considerations relating to the distance of the metal disk from the heating coil, in the practice of the invention. It has been found that it is critical that the metal disk not be located too far away from the induction coil. For example, if the disk is too far away from the induction coil, heating will not be induced. Generally, a distance of from about 0.650 inch to about 0.750 inch from the top of the induction coil to the bottom of the metal disk should be employed. This is accomplished by optimizing the thickness of the induction heating top and/or the thickness of any bottom portion of the heat retentive server. In general, the top of the induction heating unit should have a thickness which cooperates with the dimensions of the heat retentive server such that the bottom surface of the heat storage disk is located from about 0.650 inch to about 0.750 inch from the top surface of the induction coil, preferably from about 0.675 inch to about 0.725 inch, and most preferably about 0.690 inch to about 0.700 inch.

Thus, preferably the thickness of the top of the induction heating unit should be from about 0.050 inch to about 0.100 inch, preferably from about 0.060 inch to about 0.080 inch and most preferably from about 0.070 inch to about 0.075 inch. Further, the bottom surface of the heat storage member should be located from about 0.485 inch to about 0.525 inch above the surface upon which the heat retentive server is supported, more preferably from about 0.490 inch to about 0.520 inch, and most preferably from about 0.495 inch to about 0.515 inch.

In addition to the foregoing, the disk is preferably provided with a central opening 52 having a diameter of about 1.625 inches to about 1.640 inches. In preferred embodiments, this facilitates the formation of a central annular weld joint between the upper member 4 and lower member 6, such as annular weld joint 26, shown in FIG. 1.

In a preferred embodiment, there are three sets of holes in heat storage plate 3. Preferably, pillar or post shaped members 29 and annular extensions 41 cooperate with holes 51 of heat storage member 3 to retain in place heat storage member 3. Also preferably, holes 151 of heat storage member 3 and holes 152 of lower member 6 cooperate with pillar or post shaped members 150 of upper member 4 such that pillar or post shaped members 150 extend through holes 151 and 152. Post 150 is preferably retained in hole 152 by placing a connecting unit 168, such as a speed nut, on each post such that the connecting unit 168 engages lower member 6. In a preferred embodiment, the areas of contact between post 29 and annular extension 41, and between post 150 and hole 152, are not welded. A substantially airtight seal is created at hole 152 by selecting the diameters of holes 152, annular ribs 149 and cooperating posts 150 to create a tight fit. As will be described in more detail below, foam insulation cooperates in creation and maintenance of this substantially airtight seal. Although the preferred embodiment does not employ welding at these areas, those of ordinary skill in the art will recognize that welds may nevertheless be employed.

The heat storage disk is preferably provided with at least one opening 204, and even more preferably, provided with a plurality of symmetrically disposed openings 204. For example, the heat storage member 3 illustrated in FIG. 12 has five symmetrically disposed openings 51 and 151, so the illustrated heat storage member preferably has five symmetrically disposed openings 204. Openings 204 serve at least three purposes. First, one of openings 204 serves to define a location for placement of a reciprocating valve. Second, the plurality of openings 204 facilitates assembly of the heat retentive server. Each of these purposes will be described in more detail below. Third, the plurality of openings provide more pathways for the escape of vapors.

In a preferred embodiment, post 150 has diameter 0.156 inches, and connecting unit 168 is a flat steel octagonal speed nut with an outside edge-to-edge distance of 0.438 inches, and an inside edge-to-edge distance of 0.140 inches. Speed nuts fitting this description may be obtained from The Palnut Company, Mountainside, N.J., but any suitable speed nut may be employed.

The heat retentive server of the invention is preferably constructed and arranged so as to direct the heat which is stored in and liberated from the heat storage member such that the heat is retained within the insulated interior of the server defined by the central portion, the outer ring-shaped periphery and the insulated dome. This is preferably accomplished by directing the liberated heat upwardly from the heat storage disk to the interior of the server. In some embodiments, this is preferably accomplished by means of insulating foam in insulating space 15. The insulation thus serves to reduce or prevent heat loss from the side and bottom of the container and directs the heat upwardly and inwardly to direct the heat to a plate containing food and supported by upper member 4. The optional layer of fiberglass insulation may also be employed for this purpose. Insulation in space 15 and the fiberglass layer can be used alternatively or in combination. It is noted that a thin layer of air, as may be present if insulating space 15 is left "empty," may also serve as an insulator.

Figure 2:
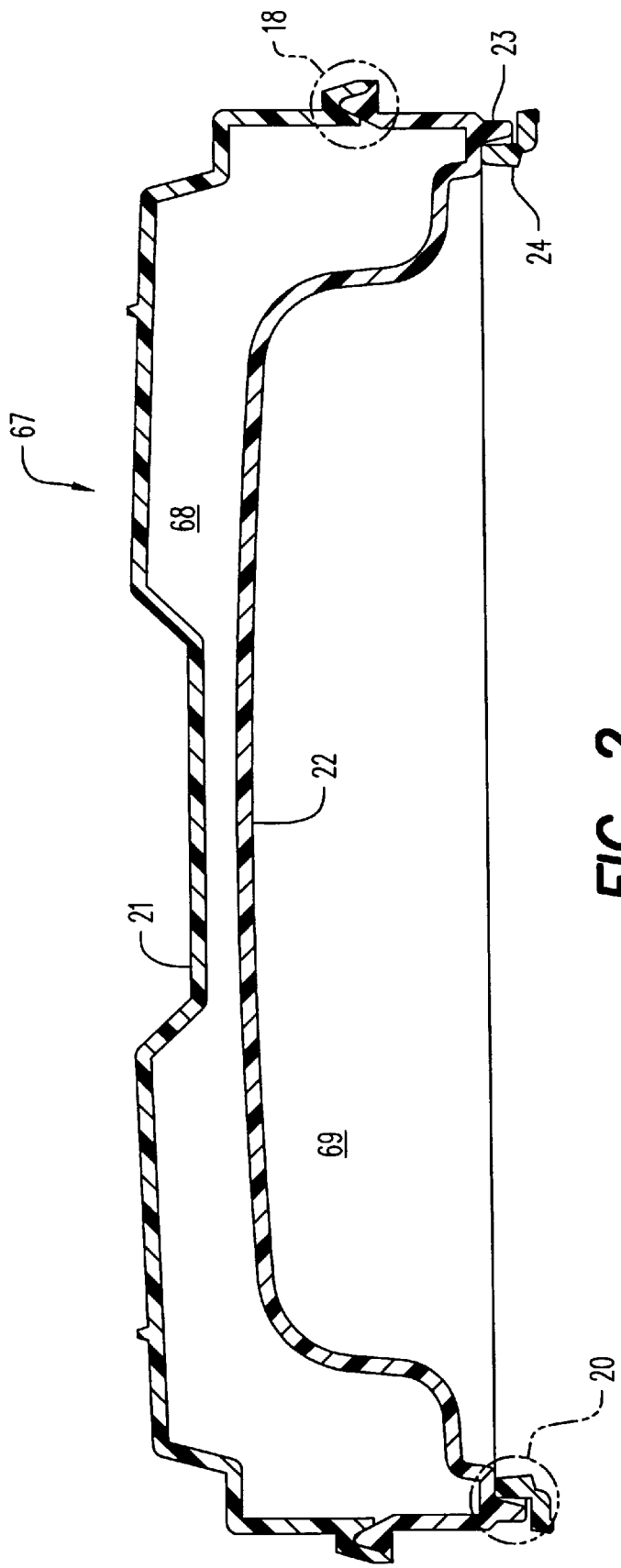
FIG. 2 is a generally transverse cross-section, taken along a plane similar to that of FIG. 1, of a heat retentive dome which is adapted to be used to cover the heat retentive server or pellet of FIG. 1.

Preferably, central portion 2 is provided with an insulated dome, such as that disclosed in FIG. 2 and designated generally as 67. Preferred structures of the dome include two walls comprising an upper wall 21 and a lower wall 22, which cooperate to define an insulated volume 68 which can comprise a space or be filed with foam. The foam is preferably, though not necessarily, the same as foam employed in space 15 between the bottom cover 12 and the central portion 2. Preferably, the upper and lower walls are joined by means of the snap-fit construction 18, described previously. Preferably, the heat retentive dome 67 includes a downwardly extending lip 23, which cooperates with upwardly extending lip 24 of the peripheral member or ring 5, shown in FIG. 1, to form joint 20, which substantially prevents heat from escaping the insulated volume 69 underneath the dome and above the central portion 2 and peripheral portion 5 of the server 1.

In one aspect of the present invention, the heat retentive server is provided with a reciprocating valve capable of opening in the event that excess pressure builds up within central unit 2. As used herein, a "reciprocating valve" refers to a valve that is capable of opening and closing in response to predetermined conditions, including valves that must be re-set. The term is used in contrast to a valve that is destroyed in responding to predetermined conditions.

Generally, the reciprocating pressure relief valve, or poppet, is maintained in a closed (non-venting) position by means of a flexible biasing member, such as a cylindrical conical or volute spring. In a preferred embodiment, the flexible biasing member comprises a conical spring. The flexible biasing member causes the valve stem to bear against the valve closure, thereby creating a seal.

Preferably, in order to improve the seal, a resilient sealing member is disposed between the valve stem and the valve closure. The resilient sealing member may be, for example, any general o-ring, including one with a circular cross-section or one with a somewhat quadrilateral cross-section (a quad seal), including quad seals with concave, convex, or substantially flat surfaces. In a preferred embodiment, a rubber quad seal from Parker Seals, Lexington, Ky. is employed.

Figure 13:
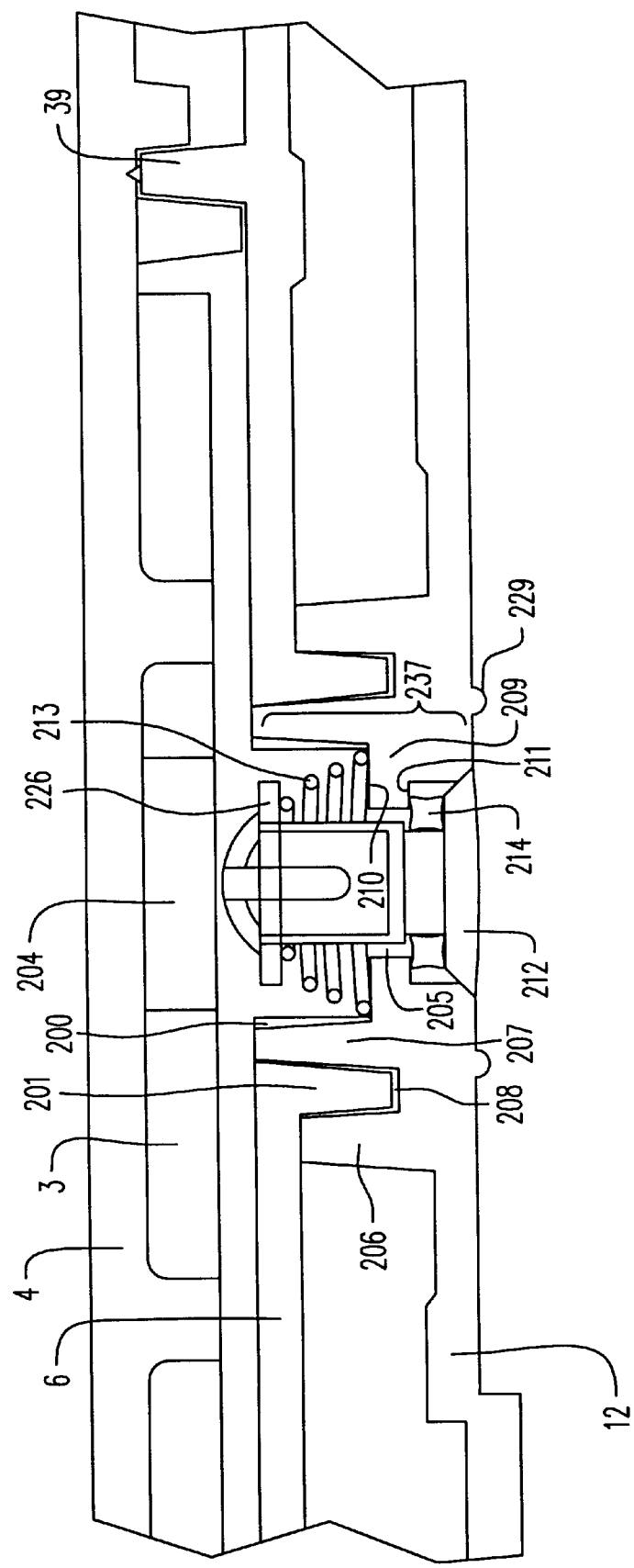
FIG. 13 is a detail view of area B of FIG. 1, showing a cross-section of the reciprocating pressure relief valve in the closed position.

A poppet of a preferred embodiment is shown in the closed (non-venting) position in FIG. 13, which is an enlarged view of area A of FIG. 1. As shown in FIG. 13, lower member 6 is provided with opening 200. Annular rib 201, which projects from lower member 6 in a direction opposed to that of annular ribs 39 and 40, is at the periphery of opening 200. Thus, annular rib 201 forms a tube 208 which cooperates with annular ribs 206 and 207 to define a conduit, generally designated as 237, which, in this particular embodiment, preferably communicates with, or alternatively, forms part of conduit 205. Bottom cover 12 is provided with conduit 205, and annular ribs 206 and 207, which ribs cooperate with rib 201 to align conduit 205 with the poppet. In a preferred embodiment, this joint is not welded. Instead, insulating foam in space 15 serves to assist in sealing the joint, as will be described in more detail below. Although not required, suitable methods of securing ribs 206 and 207 to rib 201 include welding, e.g., ultrasonic welding, solvent welding, spin welding, adhesive bonding, etc. The particular way of securing lower member 6 to bottom cover 12 can be optimized depending on the particular materials selected to be employed in the bottom cover 12 and lower member 6. The particular way of securing these members together can be readily selected by those of ordinary skill in the art.

Within conduit 205 is annular support shelf 209 with a spring-biasing surface 210 and valve seat 211. In a preferred embodiment, the flexible biasing member, which normally maintains valve member 212 in the closed position, comprises a conical spring 213. Conical spring 213 impels valve closure portion of valve member 212 toward valve seat 211, and quad seal 214, positioned between valve stem 212 and valve seat 211, thus creates a seal.

Figure 15:
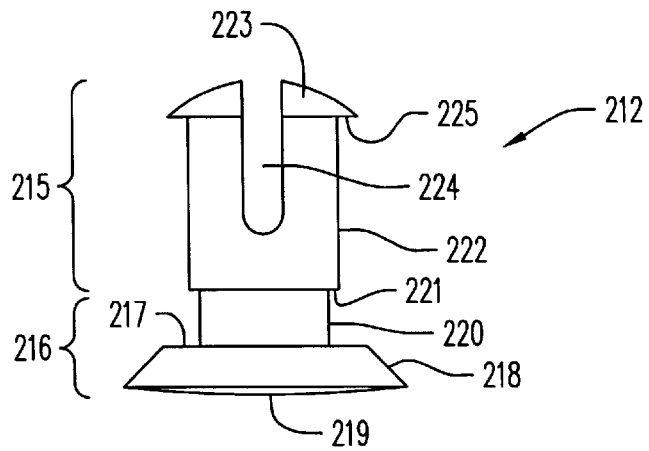
FIG. 15 is a side view of a preferred valve member which is used in the reciprocating pressure relief valve.

Valve member 212 is shown in more detail in FIG. 15. The valve member comprises two portions, valve stem 215 and valve closure 216. Valve closure 216 comprises substantially cylindrical portion 220 and substantially planar annular surface 217, which are substantially at right angles to each other. Valve closure 216 flares outward to form somewhat conical surface 218. The distal surface 219 of the valve closure may be slightly conical or domed in order to more effectively drain water and other aqueous fluids from surface 219. In a preferred embodiment, shelf 221 is located at the transition between valve closure 216 and valve stem 215. In a preferred embodiment, quad seal 214 is placed on valve closure 216 and retained in place through the cooperation of shelf 221, cylindrical portion 220 and annular surface 217.

Figure 16:
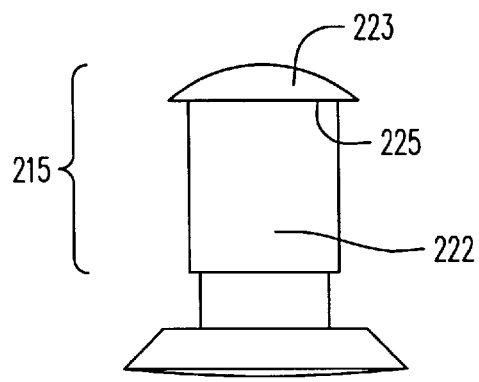
FIG. 16 is similar to FIG. 15, but the valve member is rotated 90° about the longitudinal axis.
Figure 17:
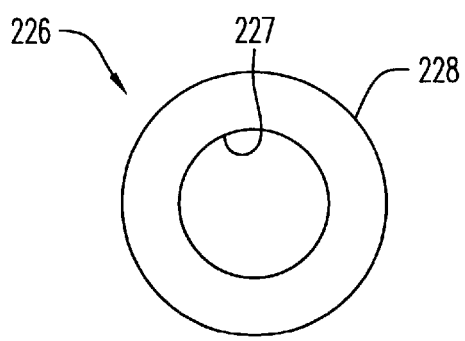
FIG. 17 is a top plan view of the annular retaining disk.

One view of valve stem 215 is shown in FIG. 15, and another view at a 90° angle about the long axis of the valve stem is shown in FIG. 16. In the embodiment shown, the upper portion of valve stem 215 comprises two legs 222 with volume 224 between the legs. Inner circumference 227 of annular retaining disk 226, illustrated in FIG. 17, is chosen large enough that it may be placed on valve stem 215 by forcing it over distal surface 223, yet small enough that shelf 225 retains the annular retaining ring on the valve stem. In this embodiment, placement of annular retaining ring 226 is facilitated by volume 224, which permits legs 222 to bend inward, thus permitting installation of disk 226. The distal surface 223 of valve stem 215 is preferably somewhat rounded or conical in order to facilitate placement of conical spring 213 and annular retaining disk 226. Outer circumference 228 is chosen large enough to reliably maintain conical spring 213 on the valve stem.

Because of the proximity of valve member 212 and annular retaining disk 226 to heat storage disk 3 in the embodiment shown, it is preferable that these valve parts are made of materials resistant to repeated exposure to high temperatures. In a preferred embodiment, valve member 212 is made of an acetal polymer. A suitable acetal polymer is natural (i.e., without colorants) Delrin® P500 (Dupont, Wilmington, Del.). Annular retaining disk 226 may be made, for example, of nylon-66.

Annular retaining ring 226 serves to retain the flexible biasing member 213 on valve member 212. In the embodiment shown, the narrower end of the conical spring bears on the annular retaining disk, which, in turn, bears on the valve stem. Thus, when the flexible biasing member is herein said to bear on the valve stem, this includes cases where the flexible biasing member bears directly or indirectly on the valve stem.

In a preferred embodiment, the effective area of the valve is a circle of 0.236 inches in diameter. Conical spring 213 comprising the flexible biasing member comprises 0.023 inch diameter 17–7 spring steel and takes about 5–8 lbs of force (about 8–13 atm) to open. This spring is flat wound with four turns, has a bottom diameter of 0.399 inches, a top diameter of 0.280 inches, and an uncompressed height of 0.218 inches. Further, annular retaining ring 226 in this preferred embodiment (obtained from Micro Plastics, Flippin, Ark.) is made of nylon-66, with an inner diameter of 0.194 inches, an outer diameter of 0.375 inches, and a thickness of 0.032 inches.

The flexible biasing member may be installed and retained on the valve stem by other methods as well. In one variation, for example, more than two legs may be used. In another variation, the valve stem is not divided into legs, but the flexible biasing member is retained on the valve stem through the use of, for example, a nut or spring clip. In another variation, the valve stem comprises legs, but no annular retaining disk is employed; in such a variation, the flexible biasing member may bear directly on the valve stem. These and other methods and structures may be designed and implemented by those of ordinary skill in the art.

Figure 14:
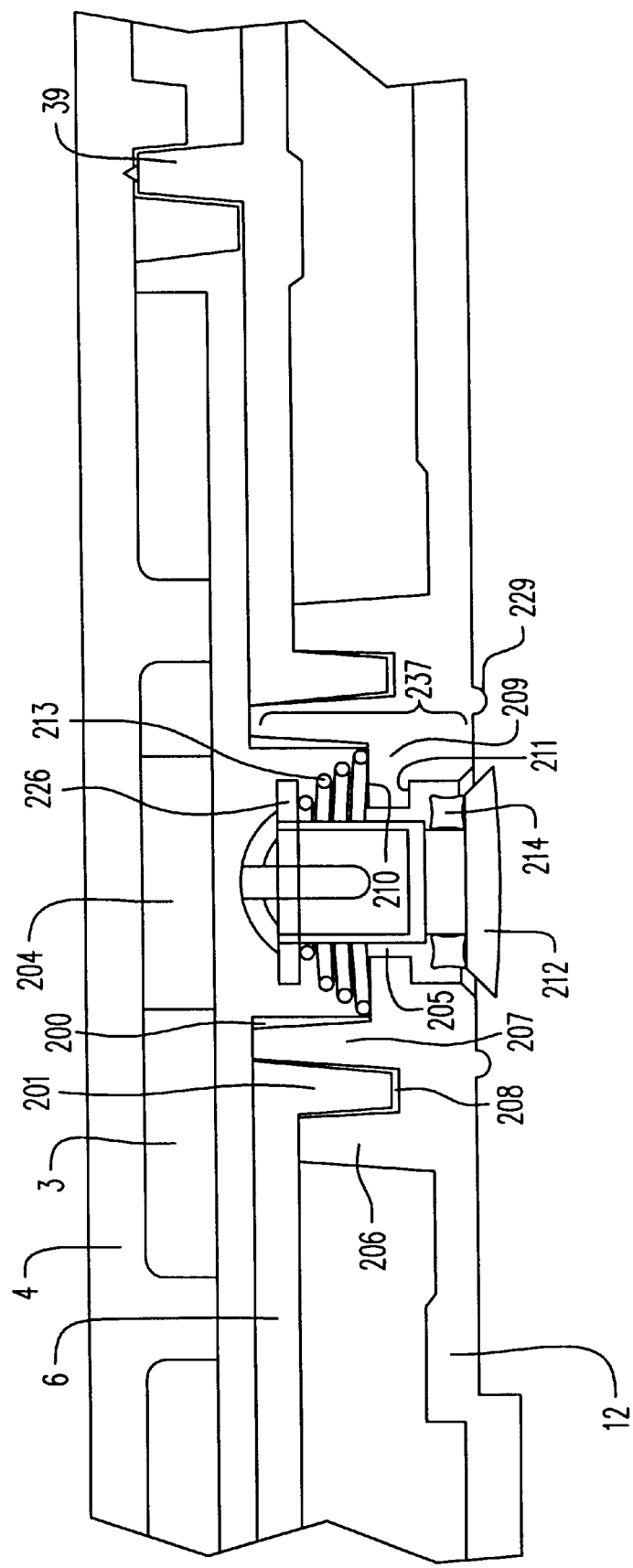
FIG. 14 is similar to FIG. 13, but shows the pressure relief valve in the open position.

In a preferred embodiment, the spring-biased valve is installed so that it vents excess pressure toward the bottom of the heat-retentive server. In order to reduce the chance that physical contact with an object will block the valve and prevent it from opening, lower cover 12 is provided with a plurality of protrusions 229 which are located near opening 205. Surface 219 is preferably somewhat flush with lower surface of bottom cover 12. FIG. 14 illustrates a preferred reciprocating valve in the open (venting) position.

In normal operation, one end of spring 213 bears on the valve stem of valve member 212, and the other end of the spring bears on support surface 210. This causes quad seal 214 to be compressed between valve seat 209 and annular surface 217. Thus, the valve is brought into a sealingly engaged closed position. In the presence of a predetermined excess pressure inside the upper chamber relative to atmospheric pressure, the valve opens, vents the pressure, and then closes. The pressure at which the spring-biased valve opens may be determined by application of Hooke's Law, as is familiar to those of ordinary skill in the art.

The poppet preferably releases the excess pressure gradually, and not in a sudden burst. In this fashion, the operator is protected from the released hot gasses, while still permitting the desirable pressure relief In another preferred embodiment, lower member 6 is provided with at least one opening 202, shown in FIG. 8. When more than one opening 202 is provided, they may occur singly or in "clusters." As used herein, the term "cluster" refers to the juxtaposition of two or more openings 202, separated by narrow bridges 203. Without being limited to a particular theory, it is believed that the bridges prevent the expanding foam insulation in space 15 from pushing the diaphragm into the central portion. The particular cross-sectional area of the openings, and the number of openings per cluster are not critical, and will normally depend, for example, on the diaphragm material and expected valve bursting pressure. Typical cross-sectional areas are about 0.23 sq.in., and there will typically be about 4 openings per cluster. Similarly, the particular lengths and widths of the bridges are not critical and will normally depend on the sizes of the openings and the general size of the cluster. Typical lengths are about 0.25 in., and typical widths are about 0.10 in. In a preferred embodiment, lower member 6 is provided with one cluster of four openings. In this embodiment, openings 202 are shaped somewhat like triangles or quarter circles, and are arranged in a somewhat circular arrangement. As the bridges 203 are arranged in FIG. 8, they appear as two somewhat perpendicular diameters of those circles. Membrane 230 is placed over each cluster.

It is advantageous to adhesively attach membrane 230 to lower member 6 either directly, as with an adhesive, or indirectly, as with adhesive fasteners, but any mechanical or other method, such as electrostatic adhesion, may also be employed. Further, any combination of methods of attachment could be used. In an alternate design, for example, one could position the cluster so that one or more speed nuts acting as connecting units 168 also serve to clamp membrane 230 to lower member 6, possibly augmented with one or more adhesive fasteners 233, which may be the aforementioned tape dots. Thus, as used herein, the term "adhesively attached" should be broadly interpreted, and includes cases where an adhesive layer is disposed between membrane 230 and lower member 6 as well as cases where an adhesive backed material is applied over both membrane 230 and lower member 6. Membrane 230 may be made of any material, and may comprise, for example, cellulosic or synthetic polymeric material. In order to normally prevent communication between upper chamber 231 and insulating space 15, membrane 230 should be substantially impermeable to gas. By "substantially impermeable" is meant that little gas, if any, is capable of transporting through the membrane over the time period in which the server is heated, i.e., about ten seconds in the case of an inductively heated server.

Figure 18B:
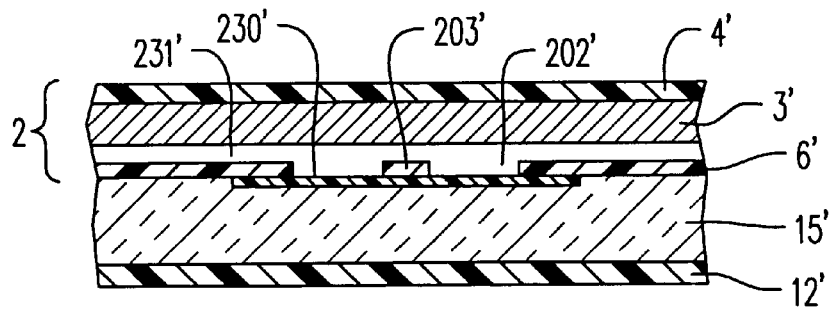
FIG. 18b is a cross-sectional view, along a line similar to that of Line A of FIG. 8, of an alternate diaphragm valve according to the present invention.
Figure 18A:
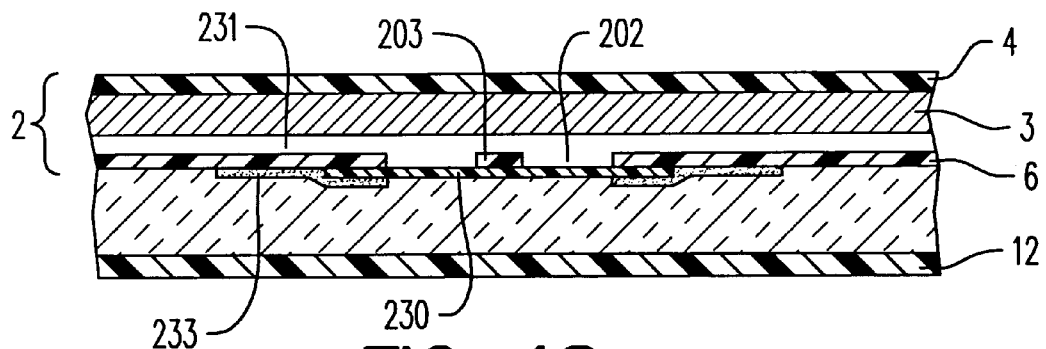
FIG. 18a is a cross-sectional view of a diaphragm valve according to the present invention, as viewed along Line A of FIG. 8.

A slightly off-center cross-section of an inventive membrane valve in the assembled server, viewed along line A of FIG. 8, is presented in FIG. 18a, and a view from above, through lower member 6 may be seen in FIG. 8. In this embodiment, membrane 230 comprises a polyolefin such as polyethylene or polypropylene. Compositions comprising polyolefins are advantageous for membrane 230 because they are substantially impermeable to gas and do not tend to adhere well to either the foam insulation in insulating space 15, or the material of lower member 6. The polyolefin composition may comprise fillers and other additives, such as calcium carbonate. In one embodiment, membrane 230 is placed over a cluster of openings 202 and fixed in place by a plurality of adhesive fasteners 233 at the periphery of membrane 230. In this embodiment, membrane 230 is further retained in place in the assembled server by insulation in space 15. In a preferred embodiment, adhesive fasteners 233 are adhesive-backed cellulosic or polymeric sheet, i.e., adhesive tape, which may be draftsmen's tape dots, such as those available from 3M with 0.75 inch diameter and 2310M adhesive.

Referring to FIG. 8, a preferred embodiment of the invention uses four circular adhesive fasteners 233 to adhesively attach membrane 230 to lower member 6. Where adhesive fasteners are used, it is preferred that portions of the periphery of the adhesively attached membrane are not covered by the fasteners. Although use of four circular adhesive fasteners per valve is preferred, any shape or number of adhesive fasteners, may be employed. For example, the adhesive fastener may be star- or plus-shaped, thereby permitting use of only one adhesive fastener while still permitting portions of the periphery of membrane 230 to be not adhesively attached.

In the preferred embodiment, membrane 230 is a 1.5 inch polypropylene plastic film disc. The exact composition is not critical to the functioning of the valve. For reasons of availability, the membrane used in the preferred embodiment is polypropylene with about 40% $CaCO_3$.

Figure 19:
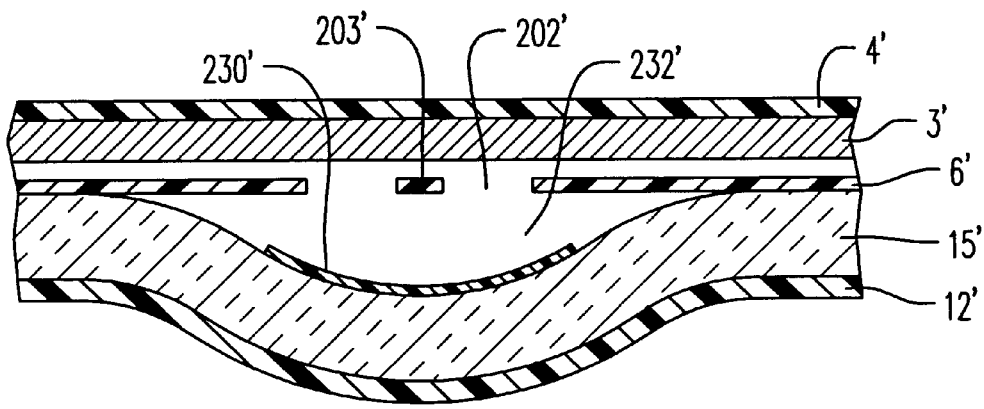
FIG. 19 shows the valve of FIG. 18b after it has released pressure and destroyed the server.

A slightly off-center cross-section of an alternate embodiment of a diaphragm valve according to the present invention is illustrated in FIG. 18b, in which like elements to those in FIG. 18a are designated with reference to numerals having primes. In this embodiment, membrane 230' is adhesively attached to the outer surface of lower member 6', and further retained in place in the assembled server by insulation in space 15'. When attached to lower member 6' with an adhesive, the adhesive may be applied to the membrane, to lower plate 6' or to both. When an adhesively attached membrane is employed, and the adhesive is applied to the membrane material, then the membrane may be considered to comprise the combination of membrane material and adhesive. As shown in FIG. 19, in the event that the pressure in chamber 231' rises excessively, membrane 230' is forced off the surface of lower member 6'. The excess pressure then enters the outer chamber, forces the foam insulation to separate from lower member 6', and produces a bulge in the lower surface of the server. The excess pressure is relieved by permitting the gas to expand into the newly created volume 232 in the lower chamber. By containing the released pressure in the lower chamber, the operator is protected from a sudden burst of steam. The bulge is preferably a permanent feature, which remains, though possibly smaller, after the server cools. Thus, the bulge also serves as an indication to the operator that the heat retentive server is no longer operable and should be discarded.

Variations of the membrane valve may be designed and manufactured by those of ordinary skill in the art. For example, the membrane need not remain intact after pressure relief is accomplished, but may be perforated or torn. Additionally, so long as the excess pressure is vented into the lower chamber, it is not important that the insulation material be forced off the lower member. Thus, for example, the insulation may tear, and partially remain attached to the lower member in the vicinity of the valve openings.

In a preferred embodiment, the heat retentive server comprises both types of valves. As shown in FIG. 8, this embodiment comprises one spring-biased valve and one membrane valve. Without limiting the invention in any way, it is intended that the spring-biased valve be the primary pressure relief device because it is safe, re-usable and non-destructive It is possible, however, that the poppet could become inoperable. This could occur, for example, if foods are permitted to dry on the valve outlet. In such a case, the membrane valve serves as an emergency back-up. When the membrane valve vents excess pressure, the server is destroyed, and safely signals its destruction to the operator through the noise of the valve rupture, and through distortion of the bottom cover of the server.

In embodiments employing both types of inventive pressure relief systems, therefore, it is advantageous to select two predetermined pressures at which the pressure relief systems are activated. The predetermined pressure for activation of the poppet is advantageously selected to be lower than the activation pressure for the membrane valve in order to extend the life of the product. Both predetermined pressures are conveniently chosen to be greater than, or about equal to, 0.6 atm gauge. Even more preferably, both predetermined pressures are chosen to be appreciably greater than 0.6 atm gauge, so that the poppet does not open at all in normal operation, but only functions in the event of excess pressure build-up. While it is not necessary for the predetermined pressures to be precisely determined, it is preferable to select both predetermined pressures somewhat below the expected bursting pressure of the heat retentive server or other article. This latter preference is primarily for reasons of safety, and is not limitative of the present invention.

It is important, especially for the poppet valve, that all components of the inventive heat retentive servers be assembled in the correct orientation with respect to each other. Thus, individual components of heat retentive servers according to the present invention are preferably provided with structure to ensure correct orientation and to facilitate assembly. In this regard, upper member 4, lower member 6, heat storage member 3 and outer ring 5 are advantageously preferably provided with structure to facilitate proper positioning of the parts during assembly. Thus, heat storage member 6 is placed on upper member 4 so that posts 150 are inserted through openings 51. When heat storage member 6 is provided with a plurality of symmetrically disposed openings 204, as shown in FIG. 12, the orientation of heat storage member 3 on upper member 4 becomes immaterial, thus facilitating assembly. Lower member 6 is place on upper member 4 so that locator slot 170 matingly engages locator tab 173 and so that posts 150 are inserted through openings 152. This assures that openings 200 and 204 are aligned. Upper member 4 is preferably attached to lower member 6 before central portion 2 is placed in outer ring 5. As discussed above, attachment of these parts is preferably accomplished both with ultrasonic welding and with speed nuts. Placement of central portion 2 into outer ring 5 is facilitated by matingly engaging locator slot 171, formed by locator wings 172, with locator tab 169. Central portion 2 and outer ring 5 are attached with speed nuts as described above.

Figure 20:
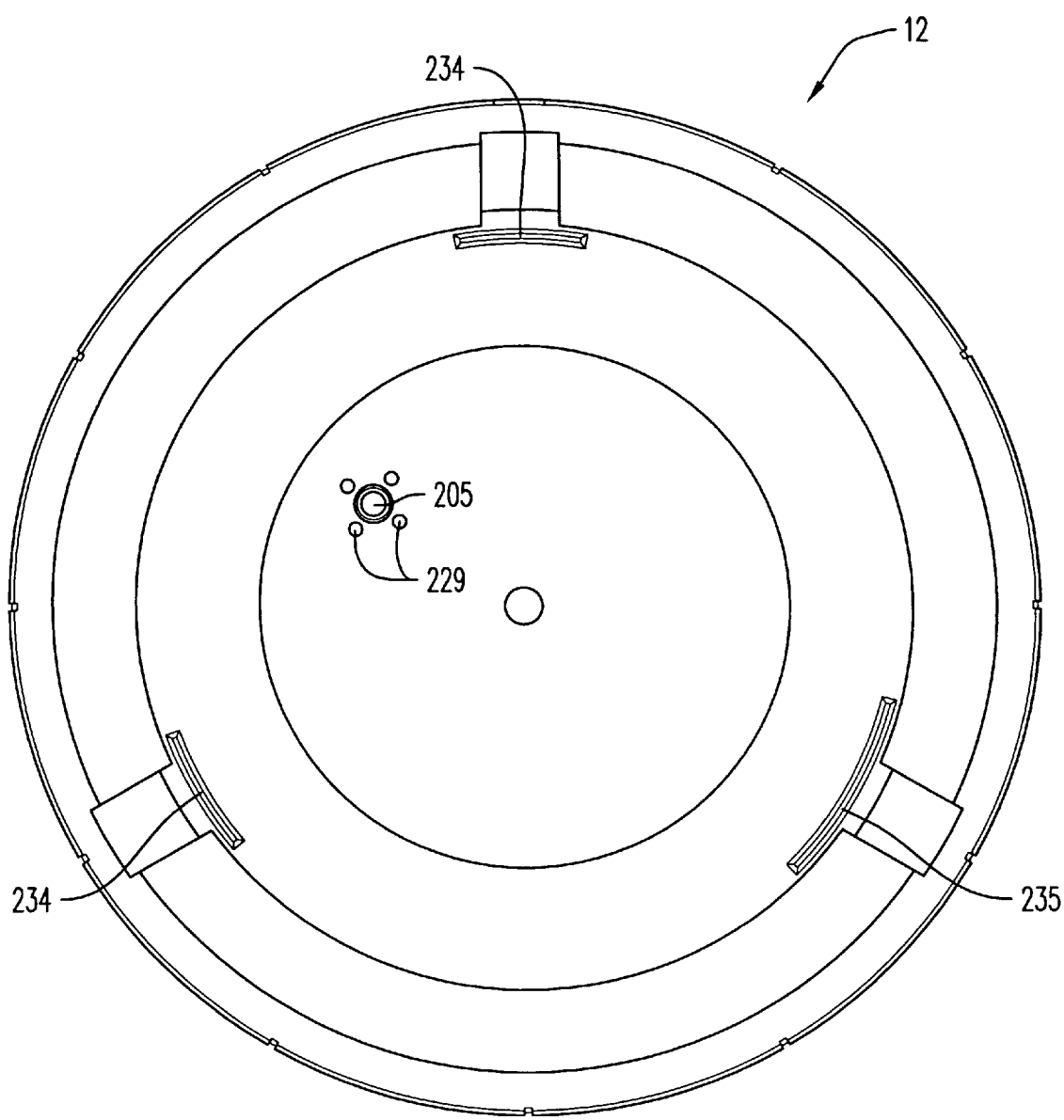
FIG. 20 is a bottom plan view of a preferred bottom cover according to the present invention.

Next, the central portion/outer ring assembly is placed into the top portion of a press and retained in place magnetically. The top portion of the press is designed so that wings 172 assure proper orientation of this assembly in the press. Bottom cover 12 is placed in the bottom portion of the press. The bottom portion of the press is designed so that, referring to FIG. 20, the difference in length between the long leg 235 and short legs 234 of the bottom cover assures proper orientation in the press. The expanding foam insulation is then applied to the bottom cover and the press closed to "snap" the server together. The expanding foam insulation helps to ensure a good snap fit. The details of the snap-fit connection are given in U.S. Pat. No. 5,145,090 to WYATT, incorporated above by reference. The server is then preferably removed from the press and placed in a curing chamber maintained at approximately 120° F. for approximately six minutes.

In the preferred embodiments, the expanding foam preferably serves several purposes. As insulation, the foam insulates the lower portion of the heat storage member, thus directing heat upward toward the chamber containing the food. That is, the foam assists in both heat retention and heat direction. As an expanding foam, the foam fills essentially the entire insulating space 15. Thus, it backs the diaphragm valves of the present invention, permitting them to function properly. Further, the foam expansion contributes to the seal between post 150 and hole 152. Further, the foam expansion forces central portion 2 and bottom cover 12 in opposite directions, thereby assisting in creation and maintenance of the seal between central portion 2 and outer ring 5. Further, the foam at least partially seals against tube 208 thus creating a seal for the poppet. Further, if the bottom cover is improperly snapped into outer ring 5, or if there is a manufacturing defect, then foam may expand into conduit 205 and leak out of the server, becoming visible to line personnel. Thus, the foam expansion also functions to indicate proper assembly of the server.

Again, as previously indicated, it will be readily understood by those of ordinary skill in the art that although the heat retentive server of the invention is referred to in preferred embodiments as being generally disk-shaped and including disk-shaped elements, the heat retentive server can be of any shape, and include elements of any shape. For example, it is expressly contemplated that non-circular and non-disk-shaped embodiments are within the scope of the present invention. For example, the heat storage member can be approximately polygonal, including shapes which are, for example, rectangular or square.

Thus, each of these embodiments comprises a chamber with a heat storage member and a valve. The heat storage member is in an interior region, and in the presence of a predetermined excess pressure, the valve vents the pressure into a relief region, which may be either a second interior region, or an exterior region. The illustrative embodiments preferably include a central portion, a heat storage disk, an upper member, a lower member, and at least one valve, and these parts can be substantially identical to each other throughout these embodiments. However, those of ordinary skill in the art will readily recognize that there can be differences with respect to these embodiments.

Induction heating units which may be advantageously used with the present invention are discussed at length in WYATT, incorporated above by reference.

The foregoing embodiments are described in an illustrative, rather than limitative, sense. For example, although the inventive pressure relief system is especially suited for use in inductively heated heat retentive servers, those of ordinary skill in the art will recognize that it may be adapted for use in a conventionally heated server as well. From the foregoing description, one of ordinary skill in the art can easily ascertain the essential characteristics of this invention, and without departing from the spirit and scope thereof, can make various changes and modifications of the invention to adapt it to various uses and conditions.

What is claimed is:

1. A heat retentive server adapted to be inductively heated comprising:
   a central portion for holding a plate containing food;
   an enclosure defining an interior region and an exterior region;
   a heat storage member disposed within said interior region, said heat storage member comprising a material which is susceptible to being heated by induction; and
   a valve capable of opening in response to an increase in pressure in said interior region relative to pressure in said exterior region to allow fluid communication between said interior region and said exterior region.

2. The heat retentive server of claim 1 wherein said valve comprises:
   an opening in said enclosure, said opening comprising a valve seat;
   a valve member comprising a valve closure portion;
   a resilient biasing member constructed and arranged to urge said valve closure portion toward said valve seat; and
   a resilient sealing member disposed between said valve closure portion and said valve seat;
   so that, in the presence of increased pressure in said interior region relative to said exterior region, said increased pressure causes said valve to open, thereby venting fluid from said interior region to said exterior region, and said resilient biasing member otherwise brings said valve closure portion, said resilient sealing member and said valve seat into sealing engagement.

3. The heat retentive server of claim 2 wherein said resilient biasing member comprises a spring.

4. The heat retentive server of claim 3 wherein said spring comprises a conical spring.

5. The heat retentive server of claim 2 wherein said resilient sealing member comprises an o-ring.

6. The heat retentive server of claim 2 wherein said resilient sealing member comprises a quad seal.

7. The heat retentive server of claim 1 further comprising an additional enclosure defining an insulating region, wherein said insulating region is substantially separate from both said interior region and said exterior region, said server further comprising an additional valve, wherein said additional valve is capable of opening in response to an increase in pressure in said interior region relative to said insulating region to thereby vent fluid from said interior region to said insulating region.

8. The heat retentive server of claim 7 wherein said enclosure and said additional enclosure have a common wall portion, said additional valve comprises an opening and a membrane substantially impermeable to fluid, said opening is in said common wall portion to allow communication between said interior region and said insulating region, said membrane is within said insulating portion and is positioned to cover said opening, so that said additional valve is capable of opening in response to an increase in pressure in said interior region relative to said insulating region, thereby allowing communication between said interior region and said insulating region.

9. The heat retentive server of claim 8 wherein said opening comprises a cluster of multiple openings.

10. The heat retentive server of claim 8 wherein said membrane comprises a polyolefin.

11. The heat retentive server of claim 8 wherein said membrane is adhesively attached.

12. The heat retentive server of claim 11 wherein adhesive material is disposed between said membrane and said common wall portion.

13. The heat retentive server of claim 11 wherein said additional valve further comprises a fastening member, said fastening member comprising a substantially planar adhesive face, said adhesive face contacting both said membrane and said common wall portion, thereby adhesively attaching said membrane to said common wall portion.

14. The heat retentive server of claim 13 wherein said fastening member comprises four fastening members.

15. The heat retentive server of claim 8 wherein said membrane comprises a first side facing said opening and a second side facing said insulating region, and said insulating region comprises insulation.

16. The heat retentive server of claim 15 wherein said insulation comprises foam insulation.

17. A heat retentive server adapted to be inductively heated comprising:
   a central portion for holding a plate containing food;
   a first wall and a second wall, said first and second wall being generally planar and generally parallel to each other;
   said first wall and said second wall being generally sealingly joined, defining an interior region therebetween;
   an exterior region substantially separate from said interior region;
   a heat storage member within said interior region, said heat storage member comprising a material which is susceptible to being heated by induction; and
   at least one valve, wherein said at least one valve is capable of opening to allow fluid communication between said interior region and said exterior region.

18. The heat retentive server of claim 17 further comprising:
   a third wall, said third wall being generally planar and generally parallel to one of said first and second walls;
   said second wall and said third wall being generally sealingly joined, defining a chamber therebetween;
   said second wall having a first side facing said interior region, and a second side facing said chamber;
   wherein said exterior region is substantially separate from said interior region and said chamber, and wherein said at least one valve is capable of opening to allow fluid communication between said interior region and at least one of said chamber and said exterior region.

19. The heat retentive server of claim 18 wherein said second wall is provided with an opening disposed to allow communication between said interior region and said chamber, said valve comprises a membrane, said membrane is adhesively attached to said second side of said second wall, and said membrane is positioned to cover said opening in said second wall; said valve being capable of opening in response to an increase in pressure in said interior region relative to said chamber to thereby allow fluid communication between said interior region and said chamber.

20. The heat retentive server of claim 19 wherein said chamber comprises insulation.

21. The heat retentive server of claim 20 wherein said insulation comprises foam insulation.

22. The heat retentive server of claim 19 wherein said opening in said second wall comprises a cluster of four openings.

23. The heat retentive server of claim 22 wherein said chamber comprises insulation.

24. The heat retentive server of claim 23 wherein said insulation comprises foam insulation.

25. The heat retentive server of claim 18 wherein said second wall is provided with a an opening disposed to allow communication between said interior region and said chamber, said valve comprises a membrane, said membrane is substantially planar, and comprises a first face and a second face, said first face of said membrane adhesively attached to said second side of said second wall, said membrane disposed to cover said opening, said membrane substantially impermeable to gas;

so that, in the presence of an increase in pressure in said first interior region relative to said chamber, said membrane ruptures, thereby allowing communication between said interior region and said chamber.

26. The heat retentive server of claim 25 wherein said valve comprises at least one fastening member, said fastening member comprising a substantially planar adhesive face, said adhesive face of said fastening member contacting both said second face of said membrane and said second side of said second wall.

27. The heat retentive server of claim 26 wherein said chamber comprises insulation.

28. The heat retentive server of claim 27 wherein said insulation comprises foam insulation.

29. The heat retentive server of claim 18 wherein said valve comprises:

a conduit, comprising a valve housing, to connect said interior region and said exterior region; and a valve member disposed inside said conduit;

said valve permitting fluid communication between said interior region and said exterior region in the presence of an increased pressure in said interior region relative to said exterior region, said valve otherwise substantially preventing fluid communication between said interior region and said exterior region.

30. The heat retentive server of claim 18, wherein said valve comprises a conduit to connect said interior region and said exterior region, said conduit comprising a valve seat;

a valve member comprising a valve closure portion;

a resilient sealing member disposed between said valve closure portion and said valve seat; and, a resilient biasing member constructed and arranged to urge said valve closure portion toward said valve seat;

so that, in the presence of an increased pressure in said interior region relative to said exterior region, said increased pressure causes said valve to open, thereby venting fluid from said interior region to said exterior region, and said resilient biasing member otherwise brings said valve closure portion, said resilient sealing member, and said valve seat into sealing engagement.

31. The heat retentive server of claim 30 wherein said second wall is provided with a first opening, said third wall is provided with a second opening, and said conduit connects said first opening and said second opening.

32. A heat retentive server adapted to be inductively heated comprising:

a central portion for holding a plate containing food;

a first chamber comprising an interior and exterior, said interior containing a member susceptible to being heated by induction, and comprising a wall comprising a first valve, said first valve being capable of opening to allow fluid communication between said interior of said chamber and said exterior of said chamber; and a second chamber;

said first chamber also comprising a second valve, said second valve capable of opening to allow fluid communication between said interior of said first chamber and said second chamber;

wherein either said first valve or said second valve is capable of opening in response to an increase in pressure in said first chamber.

33. A heat retentive server adapted to be inductively heated comprising:

a central portion for holding a plate containing food;

an enclosure defining an interior region;

a heat storage member disposed within said interior region, said heat storage member comprising a material which is susceptible to being heated by induction;

a relief region selected from the group consisting of a second interior region and an exterior region; and a valve capable of opening in response to an increase in pressure in said interior region relative to pressure in said relief region.

* * * * *